United States Patent
Hagiwara

(10) Patent No.: US 9,323,744 B2
(45) Date of Patent: Apr. 26, 2016

(54) TRANSLITERATION DEVICE, TRANSLITERATION PROGRAM, COMPUTER-READABLE RECORDING MEDIUM ON WHICH TRANSLITERATION PROGRAM IS RECORDED, AND TRANSLITERATION

(75) Inventor: Masato Hagiwara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 323 days.

(21) Appl. No.: 13/825,899

(22) PCT Filed: Feb. 28, 2012

(86) PCT No.: PCT/JP2012/054956
§ 371 (c)(1),
(2), (4) Date: May 17, 2013

(87) PCT Pub. No.: WO2012/121063
PCT Pub. Date: Sep. 13, 2012

(65) Prior Publication Data
US 2013/0246042 A1 Sep. 19, 2013

(30) Foreign Application Priority Data
Mar. 4, 2011 (JP) .................................. 2011-048384

(51) Int. Cl.
G06F 17/28 (2006.01)
G06F 17/22 (2006.01)

(52) U.S. Cl.
CPC ........ *G06F 17/2809* (2013.01); *G06F 17/2223* (2013.01)

(58) Field of Classification Search
CPC .......................... G06F 17/2809; G06F 17/2223
USPC .......................................................... 704/2
See application file for complete search history.

(56) References Cited

U.S. PATENT DOCUMENTS 6,272,464 B1   8/2001 Kiraz et al.
7,805,290 B2 * 9/2010 Janakiraman ....... G06F 17/2863
                                                      704/2

(Continued)

FOREIGN PATENT DOCUMENTS

JP   2001-296880 A   10/2001
JP   2005-092682 A    4/2005
JP   2007-156545 A    6/2007

OTHER PUBLICATIONS

Kuo et al, "Mining Transliterations from Web Query Results: An Incremental Approach," 2008, Sixth SIGHAN Workshop on Chinese Language Processing, pp. 16-23.*

(Continued)

*Primary Examiner* — Lamont Spooner
*Assistant Examiner* — Oluwadamilola M Ogunbiyi
(74) *Attorney, Agent, or Firm* — Sughrue Mion, PLLC

(57) ABSTRACT

A transliteration device (100) comprises a generation part (105) generating rewriting tables corresponding to K different languages and including multiple rewriting probabilities that an original segment can be rewritten as a transliterated segment for transliteration and transliteration tables corresponding to the K languages. The transliteration device (100) further comprises an update part (107) saving the transliteration probability that an original spelling string originating from a language corresponding to the used rewritten language is transliterated to a target spelling string in the transliteration table corresponding to the language, and so updating the K rewriting tables as to maximize the expected value of a likelihood function calculating the likelihood of the K transliteration tables.

12 Claims, 28 Drawing Sheets

(56) References Cited

U.S. PATENT DOCUMENTS

| | | | | |
|---|---|---|---|---|
| 8,655,643 B2* | 2/2014 | Haddad | G06F 17/2223 | 370/352 |
| 2005/0114145 A1* | 5/2005 | Janakiraman | G06F 17/289 | 704/277 |
| 2009/0070095 A1* | 3/2009 | Gao | G06F 17/2827 | 704/2 |
| 2010/0094614 A1* | 4/2010 | Bilac | G06F 17/2863 | 704/2 |
| 2010/0138211 A1* | 6/2010 | Shi | G06F 17/2845 | 704/3 |
| 2011/0218796 A1* | 9/2011 | Suzuki | G06F 17/28 | 704/2 |
| 2012/0041751 A1* | 2/2012 | Elfeky | G06F 17/2223 | 704/2 |

OTHER PUBLICATIONS

Lee et al, "Acquisition of English-Chinese Transliterated Word Pairs from Parallel-Aligned Text using a Statistical Machine Translation Model," 2003, Proceedings of the HLT-NAACL, vol. 3, pp. 96-103.*

Hajime Mochizuki et al.,"Automatic Transliteration and Back-transliteration System for Languages That Use Non-Roman Alphabets in Bibliographic Citation Database", Transactions of Information Processing Society of Japan, Dec. 15, 2005, vol. 46, pp. 50-58.

Haizhou Li, et al, "Semantic Transliteration of Personal Names," Proceedings of the 45th Annual Meeting of the Association of Computational Linguistics, Jun. 2007, pp. 120-127.

Eric Brill et al, "An Improved Error Model for Noisy Channel Spelling Correction," 2000, pp. 286-293.

International Search Report of PCT/JP2012/054956, dated May 15, 2012.

* cited by examiner

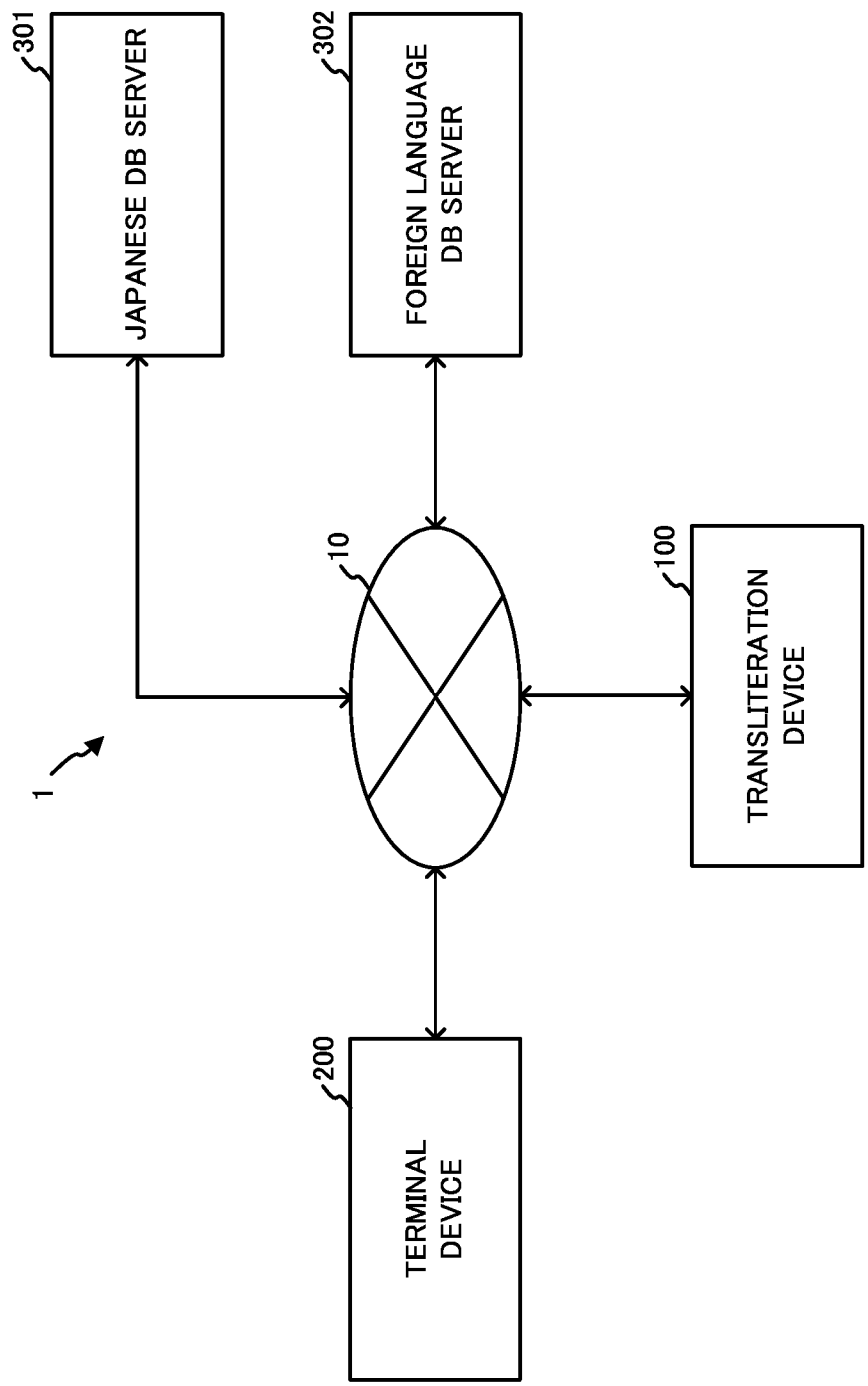

FIG.2A

ENTER TRANSLITERATION PAIR TO VERIFY.

FOREIGN LANGUAGE    JAPANESE xxnget    ○ンジェ    VERIFY

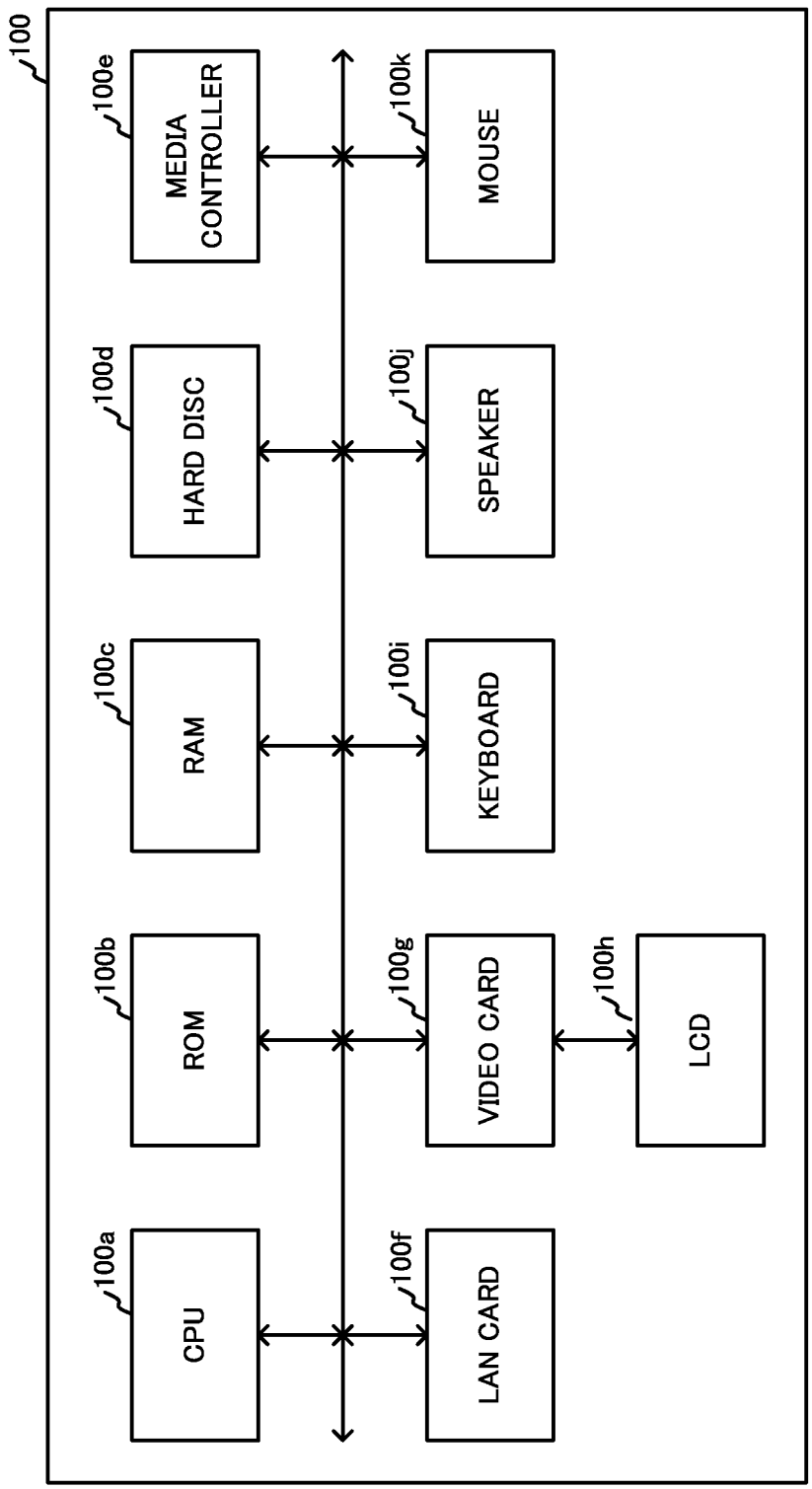

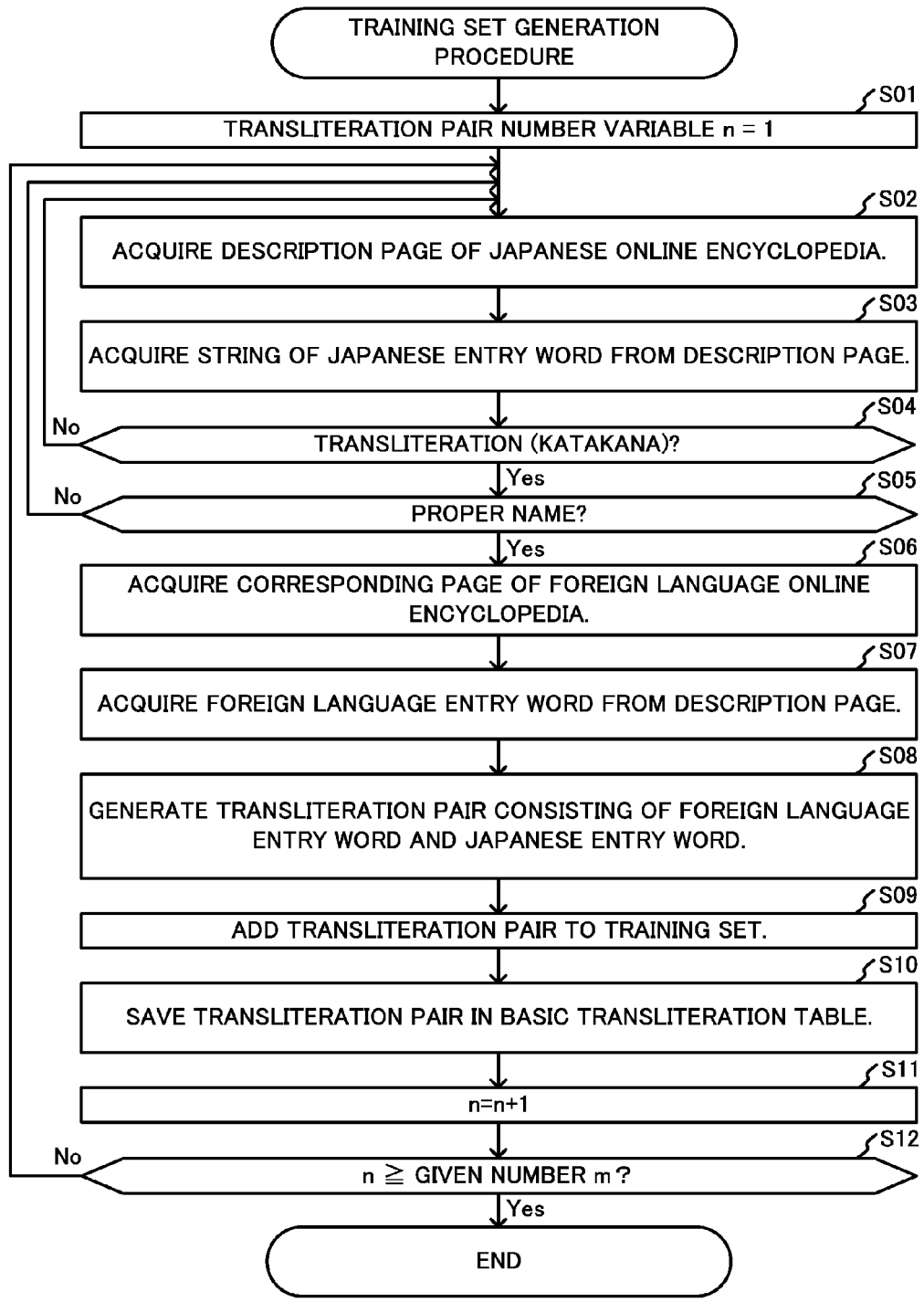

FIG.6A

BASIC TRANSLITERATION TABLE

| TRANSLITERATION PAIR NUMBER n | ORIGINAL SPELLING STRING $S_n$ | TARGET SPELLING STRING $t_n$ | TRANSLITERATION PROBABILITY $P_{\alpha\beta}(t_n\|s_n)$ |
|---|---|---|---|
| 1 | flextime | フレックスタイム | 90 |
| 2 | xxaget | ムアジェ | 10 |
| 3 | target | ターゲット | 90 |
| 4 | Wagen | ヴァーゲン | 90 |
| 5 | mama | ママ | 90 |
| ... | ... | ... | ... |

FIG.6B

FIRST TRANSLITERATION TABLE

| TRANSLITERATION PAIR NUMBER n | ORIGINAL SPELLING STRING $s_n$ | TARGET SPELLING STRING $t_n$ | TRANSLITERATION PROBABILITY $P(t_n\|s_n, z=1)$ |
|---|---|---|---|
| 1 | flextime | フレックスタイム | 89 |
| 2 | xxaget | ムアゲェ | 11 |
| 3 | target | ターゲット | 92 |
| 4 | Wagen | ヴァーゲン | 88 |
| 5 | mama | ママ | 90 |
| ... | ... | ... | ... |

FIG.6C

SECOND TRANSLITERATION TABLE

| TRANSLITERATION PAIR NUMBER n | ORIGINAL SPELLING STRING $s_n$ | TARGET SPELLING STRING $t_n$ | TRANSLITERATION PROBABILITY $P(t_n\|s_n, z = 2)$ |
|---|---|---|---|
| 1 | flextime | フレックスタイム | 93 |
| 2 | xxaget | ムアジェェ | 7 |
| 3 | target | ターゲット | 95 |
| 4 | Wagen | ヴァーゲン | 91 |
| 5 | mama | マァ | 92 |
| ... | ... | ... | ... |

FIG.6D

THIRD TRANSLITERATION TABLE

| TRANSLITERATION PAIR NUMBER n | ORIGINAL SPELLING STRING $s_n$ | TARGET SPELLING STRING $t_n$ | TRANSLITERATION PROBABILITY $P(t_n|s_n, z = 3)$ |
|---|---|---|---|
| 1 | flextime | フレックスタイム | 92 |
| 2 | xxaget | △アジェ⊥ | 12 |
| 3 | target | ターゲット | 88 |
| 4 | Wagen | ヴァーゲン | 88 |
| 5 | mama | ママ | 90 |
| ... | ... | ... | ... |

FIG.8A

BASIC REWRITING TABLE

| SEGMENT PAIR NUMBER j | ORIGINAL SEGMENT α | TRANSLITERATED SEGMENT β | REWRITING PROBABILITY P(α→β) |
|---|---|---|---|
| 1 | ^f | ^フ | 90 |
| 2 | le | レ | 90 |
| 3 | le | ル | 10 |
| 4 | x | ックス | 90 |
| 5 | get$ | ジェ$ | 10 |
| 6 | get$ | ゲ$ | 90 |
| 7 | wa | ワ | 90 |
| 8 | wa | ヴァ | 10 |
| 9 | ma | マ | 90 |
| ... | ... | ... | ... |

FIG.8B

FIRST REWRITING TABLE

| SEGMENT PAIR NUMBER j | ORIGINAL SEGMENT $\alpha$ | TRANSLITERATED SEGMENT $\beta$ | REWRITING PROBABILITY $P(\alpha \rightarrow \beta \mid z = 1)$ |
|---|---|---|---|
| 1 | ^f | ^フ | 93 |
| 2 | le | レ | 13 |
| 3 | le | ル | 77 |
| 4 | x | ックス | 87 |
| 5 | get$ | ジェ$ | 20 |
| 6 | get$ | ゲ゛$ | 12 |
| 7 | wa | ワ | 91 |
| 8 | wa | ヴァ | 11 |
| 9 | ma | マ | 89 |
| ⋮ | ⋮ | ⋮ | ⋮ |

FIG.8C

SECOND REWRITING TABLE

| SEGMENT PAIR NUMBER j | ORIGINAL SEGMENT $\alpha$ | TRANSLITERATED SEGMENT $\beta$ | REWRITING PROBABILITY $P(\alpha \rightarrow \beta \mid z = 2)$ |
|---|---|---|---|
| 1 | ^f | ^フ | 89 |
| 2 | le | レ | 91 |
| 3 | le | ル | 9 |
| 4 | x | ックス | 91 |
| 5 | get$ | ジェ$ | 11 |
| 6 | get$ | ゲ$ | 89 |
| 7 | wa | ワ | 91 |
| 8 | wa | ヴァ | 9 |
| 9 | ma | マ | 91 |
| ⋮ | ⋮ | ⋮ | ⋮ |

FIG.8D

THIRD REWRITING TABLE

| SEGMENT PAIR NUMBER j | ORIGINAL SEGMENT $\alpha$ | TRANSLITERATED SEGMENT $\beta$ | REWRITING PROBABILITY $P(\alpha \rightarrow \beta \mid z = 3)$ |
|---|---|---|---|
| 1 | ^f | ^フ | 91 |
| 2 | le | レ | 81 |
| 3 | le | ル | 13 |
| 4 | x | ックス | 92 |
| 5 | get$ | ジェ$ | 15 |
| 6 | get$ | ケ゛$ | 85 |
| 7 | wa | ワ | 11 |
| 8 | wa | ヴァ | 92 |
| 9 | ma | マ | 89 |
| ... | ... | ... | ... |

FIG.9

TABLE OF NUMBER OF TIMES OF REWRITING

| TRANSLITERATION PAIR NUMBER n | ORIGINAL SPELLING STRING $s_n$ | TARGET SPELLING STRING $t_n$ | SEGMENT PAIR NUMBER j | ORIGINAL SEGMENT $\alpha$ | TRANSLITERATED SEGMENT $\beta$ | NUMBER OF TIMES OF REWRITING $f_n(\alpha \rightarrow \beta)$ |
|---|---|---|---|---|---|---|
| 1 | flextime | フレックスタイム | 1 | f | フ | 1 |
| 1 | flextime | フレックスタイム | 2 | le | レ | 1 |
| 1 | flextime | フレックスタイム | 3 | le | ル | 0 |
| ... | ... | ... | ... | ... | ... | ... |
| 9 | mama | ママ | 100 | ma | マ | 2 |
| ... | ... | ... | ... | ... | ... | ... |

FIG.12A

FIRST TRANSLITERATION TABLE

| TRANSLITERATION PAIR NUMBER n | ORIGINAL SPELLING STRING $s_n$ | TARGET SPELLING STRING $t_n$ | TRANSLITERATION PROBABILITY $P(t_n|s_n, z = 1)$ |
|---|---|---|---|
| 1 | flextime | フレックスタイム | ↑ |
| 2 | xxaget | ムアジェ | ← |
| 3 | target | ターゲット | → |
| 4 | Wagen | ヴァーゲン | → |
| 5 | mama | ママ | ・・・ |
| ・・・ | ・・・ | ・・・ | |

↑ HIGHER PROBABILITY THAN OTHER TABLES
↓ LOWER PROBABILITY THAN OTHER TABLES

FIG.12B

FIRST WEIGHTED AVERAGE TRANSLITERATION PROBABILITY TABLE

| FIRST WEIGHTED AVERAGE TRANSLITERATION PAIR NUMBER n | ORIGINAL SPELLING STRING $S_n$ | TARGET SPELLING STRING $t_n$ | WEIGHTED AVERAGE TRANSLITERATION PROBABILITY $\gamma_{n1}$ |
|---|---|---|---|
| 1 | flextime | フレックスタイム | ↓ |
| 2 | xxaget | ムアゲェエ | ↑ |
| 3 | target | ターゲット | ↓ |
| 4 | Wagen | ヴァーゲン | ↓ |
| 5 | mama | マーマ | . |
| . | . | . | . |

↑ HIGHER PROBABILITY THAN OTHER TABLES
↓ LOWER PROBABILITY THAN OTHER TABLES

FIG.12C

FIRST REWRITING TABLE

| SEGMENT PAIR NUMBER j | ORIGINAL SEGMENT $\alpha$ | TRANSLITERATED SEGMENT $\beta$ | REWRITING PROBABILITY $P(\alpha \rightarrow \beta \mid z = 1)$ |
|---|---|---|---|
| 1 | ^f | ˆフ | ↓ |
| 2 | le | レ | ↓ |
| 3 | le | ル | ↑ |
| 4 | x | ックス | ↓ |
| 5 | get$ | ジェ$ | ↑ |
| 6 | get$ | ケ゛$ | ↓ |
| 7 | wa | ワ | ↓ |
| 8 | wa | ヴァ | ↓ |
| 9 | ma | マ | ↓ |
| . | . | . | . |
| . | . | . | . |
| . | . | . | . |

↑ HIGHER PROBABILITY THAN OTHER TABLES
↓ LOWER PROBABILITY THAN OTHER TABLES

FIG.13B

FOREIGN LANGUAGE "xxnget"
TRANSLITERATION CANDIDATES

| RANK | TRANSLITERATION CANDIDATES | PROBABILITY |
|---|---|---|
| 1 | ○ンジェ | 80% |
| 2 | ○ンゲット | 60% |
| 3 | ○ンゲ | 55% |

TRANSLITERATION DEVICE, TRANSLITERATION PROGRAM, COMPUTER-READABLE RECORDING MEDIUM ON WHICH TRANSLITERATION PROGRAM IS RECORDED, AND TRANSLITERATION

CROSS REFERENCE TO RELATED APPLICATIONS

This is a National Stage of International Application No. PCT/JP2012/054956 filed Feb. 28, 2012, claiming priority based on Japanese Patent Application Nos. 2011-048384 filed Mar. 4, 2011, the contents of all of which are incorporated herein by reference in their entirety.

TECHNICAL FIELD

The present invention relates to a transliteration device, transliteration program, computer-readable recording medium on which the transliteration program is recorded, and transliteration method.

BACKGROUND ART

A transliteration method known in the prior art consists of switching a transliteration model for transliterating a string $s_n$ in a language to a string $t_n$ in another language according to which is the original language of the personal name presented by the string $s_n$ in a language, Chinese, Japanese, or English, and transliterating by using the switched model for transliteration (for example, Non-Patent Literature 1).

Also known in the prior art is the $\alpha\beta$ method for calculating the transliteration probability that a string $s_n$ in a language is transliterated into a string $t_n$ in another language based on the rewriting probability that a string or a character ("a segment," hereafter) $\alpha$ constituting the string $s_n$ in a language is rewritten as a segment $\beta$ constituting the string $t_n$ in another language (for example, Non-Patent Literature 2).

PRIOR ART LITERATURE

Non-Patent Literature

Non-Patent Literature 1: Haizhou Li, and three others, "Semantic Transliteration of Personal Names," June of 2007, p 120-127; and
Non-Patent Literature 2: Eric Brill and another, "An improved error model for noisy channel spelling correction," 2000, p. 286-293.

DISCLOSURE OF THE INVENTION

Problems to be Solved by the Invention

Here, the method of the Non-Patent Literature 1 cannot switch the transliteration model if the original language of the personal name presented by a string $s_n$ in a language is unknown. The method of the Non-Patent Literature 2 cannot calculate the transliteration probability if the original language of a string $s_n$ is unknown. Therefore, these methods have a problem that it cannot be determined with accuracy whether a string $s_n$ in a language is a transliteration of a string $t_n$ in another language.

The present invention is invented in view of the above aspect and an exemplary object of the present invention is to provide a transliteration device, transliteration program, computer-readable recording medium on which the transliteration program is recorded, and transliteration method, capable of determining with greater accuracy than the prior art whether a transliterated string is a transliteration of a string to be transliterated even if the original language of the string to be transliterated is unknown.

Means for Solving the Problems

In order to achieve the above object, the transliteration device according to a first exemplary aspect of the present invention comprises:

a generation part generating, from a training set including multiple transliteration pairs consisting of an original spelling string spelled in any original language and a target spelling string transliterated from the original spelling string and spelled in a given target language, K rewriting tables corresponding to K different original languages and including multiple sets of an original segment constituting the original spelling string, a transliterated segment constituting the target spelling string, and the rewriting probability that the original segment is rewritten as the transliterated segment for transliteration, and K transliteration tables corresponding to the K original languages and including multiple transliteration pairs included in the training set; and an update part calculating, for each of multiple transliteration pairs included in the training set, the transliteration probability that the original spelling string of the transliteration pair is transliterated to the target spelling string of the transliteration pair when the original spelling string originates from the original language corresponding to the rewriting table using the rewriting probabilities included in the K rewriting tables, saving the transliteration probability in the transliteration table corresponding to the original language in association with the transliteration pair, so updating the rewriting probabilities included in the K rewriting tables as to maximize the expected value, which is calculated using the transliteration probability, of a likelihood function calculating the likelihood presenting how likely the K transliteration tables are when the training set is obtained, and repeating the calculation of the transliteration probabilities and the update of the rewriting probabilities.

Furthermore, it is possible that the transliteration device according to a first exemplary aspect of the present invention further comprises:

an initialization part initializing weighting parameters for the K transliteration tables each indicating the ratio of the original spelling strings originating from the original language corresponding to each of the K transliteration tables to multiple original spelling strings included in the training set, wherein the update part calculates, for each of multiple transliteration pairs included in the training set, the origin probability that the original language of the original spelling string is the original language corresponding to the transliteration table based on the weighted average by the weighting parameters of the transliteration probabilities included in the K transliteration tables, so updates the K weighting parameters as to maximize the expected value of a likelihood function that is calculated further using the origin probability, and repeats the calculation of the origin probability and update of the weighting parameters.

Furthermore, it is possible that in the transliteration device according to a first exemplary aspect of the present invention:

the generation part generates the K rewriting tables corresponding to K languages by generating one of the rewriting tables and altering the rewriting probability included in the one generated rewriting table for each of the K languages.

Furthermore, it is possible that in the transliteration device according to a first exemplary aspect of the present invention:

the generation part generates the K transliteration tables corresponding to K languages by generating one of the transliteration tables by the $\alpha\beta$ method using one of the rewriting tables and altering the transliteration probability included in the one generated transliteration table; and the update part updates the transliteration probabilities included in the K transliteration tables, respectively, using the EM algorithm.

Furthermore, it is possible that in the transliteration device according to a first exemplary aspect of the present invention:

the update part repeats the update until the change of the expected value of a likelihood function due to the update becomes less than a given magnitude.

Furthermore, it is possible that the transliteration device according to a first exemplary aspect of the present invention further comprises:

a reception part receiving a first string spelled in the any original language and a second string spelled in the given target language; and a probability output part obtaining the transliteration probability that the received first string can be transliterated into the received second string using the K transliteration tables and outputting the obtained transliteration probability.

Furthermore, it is possible that the transliteration device according to a first exemplary aspect of the present invention further comprises:

a reception part receiving a first string spelled in the any original language; and a candidate output part obtaining candidate strings in the given target languages into which the received first string can be transliterated and the transliteration probabilities that the received first string is transliterated into the candidate strings using the K transliteration tables, and outputting the obtained candidate strings in the ascending order of the obtained transliteration probability.

Furthermore, it is possible that in the transliteration device according to a first exemplary aspect of the present invention, the reception part receives a first string that is not included in the training set.

In order to achieve the above object, the transliteration program according to a second exemplary aspect of the present invention allows a computer to function as:

a generation part generating, from a training set including multiple transliteration pairs consisting of an original spelling string spelled in any original language and a target spelling string transliterated from the original spelling string and spelled in a given target language, K rewriting tables corresponding to K different original languages and including multiple sets of an original segment constituting the original spelling string, a transliterated segment constituting the target spelling string, and the rewriting probability that the original segment is rewritten as the transliterated segment for transliteration, and K transliteration tables corresponding to the K original languages and including multiple transliteration pairs included in the training set; and an update part calculating, for each of multiple transliteration pairs included in the training set, the transliteration probability that the original spelling string of the transliteration pair can be transliterated to the target spelling string of the transliteration pair when the original spelling string originates from the original language corresponding to the rewriting table using the rewriting probabilities included in the K rewriting tables, saving the transliteration probability in the transliteration table corresponding to the original language in association with the transliteration pair, so updating the rewriting probabilities included in the K rewriting tables as to maximize the expected value, which is calculated using the transliteration probability, of a likelihood function calculating the likelihood presenting how likely the K transliteration tables are when the training set is obtained, and repeating the calculation of the transliteration probabilities and the update of the rewriting probabilities.

In order to achieve the above object, the computer-readable recording medium according to a third exemplary aspect of the present invention records a transliteration program allowing a computer to function as:

a generation part generating, from a training set including multiple transliteration pairs consisting of an original spelling string spelled in any original language and a target spelling string transliterated from the original spelling string and spelled in a given target language, K rewriting tables corresponding to K different original languages and including multiple sets of an original segment constituting the original spelling string, a transliterated segment constituting the target spelling string, and the rewriting probability that the original segment is rewritten as the transliterated segment for transliteration, and K transliteration tables corresponding to the K original languages and including multiple transliteration pairs included in the training set; and an update part calculating, for each of multiple transliteration pairs included in the training set, the transliteration probability that the original spelling string of the transliteration pair is transliterated to the target spelling string of the transliteration pair when the original spelling string originates from the original language corresponding to the rewriting table using the rewriting probabilities included in the K rewriting tables, saving the transliteration probability in the transliteration table corresponding to the original language in association with the transliteration pair, so updating the rewriting probabilities included in the K rewriting tables as to maximize the expected value, which is calculated using the transliteration probability, of a likelihood function calculating the likelihood presenting how likely the K transliteration tables are when the training set is obtained, and repeating the calculation of the transliteration probabilities and the update of the rewriting probabilities.

In order to achieve the above object, the transliteration method according to a fourth exemplary aspect of the present invention is a method executed by a transliteration device provided with a generation part and an update part, comprising:

a generation step in which the generation part generates, from a training set including multiple transliteration pairs consisting of an original spelling string spelled in any original language and a target spelling string transliterated from the original spelling string and spelled in a given target language, K rewriting tables corresponding to K different original languages and including multiple sets of an original segment constituting the original spelling string, a transliterated segment constituting the target spelling string, and the rewriting probability that the original segment is rewritten as the transliterated segment for transliteration, and K transliteration tables corresponding to the K original languages and including multiple transliteration pairs included in the training set; and an update step in which the update part calculates, for each of multiple transliteration pairs included in the training set, the transliteration probability that the original spelling string of the transliteration pair is transliterated to the target spelling string of the transliteration pair when the original spelling string originates from the original language corresponding to the rewriting table using the rewriting probabilities included in the K rewriting tables, saves the transliteration probability in the transliteration table corresponding to the original language in association with the transliteration pair, so updates the rewriting probabilities included in the K rewriting tables as to maximize the expected value, which is calculated using the transliteration probability, of a likelihood function calculating the likelihood presenting how likely the K transliteration tables are when the training set is obtained, and repeats the calculation of the transliteration probabilities and the update of the rewriting probabilities.

Effects of the Invention

The transliteration device, transliteration program, computer-readable recording medium on which the transliteration program is recorded, and transliteration method according to the present invention can determine with greater accuracy than the prior art whether a transliterated string is a transliteration of a string to be transliterated even if the original language of the string to be transliterated is unknown.

BRIEF DESCRIPTION OF DRAWINGS

FIG. 1 is an illustration presenting an exemplary system configuration of the transliteration system according to an embodiment of the present invention;

FIG. 2A is an illustration presenting an exemplary input screen displayed by the terminal device;

FIG. 3 is an illustration presenting an exemplary hardware configuration of the transliteration device according to an embodiment of the present invention;

FIG. 4 is a flowchart presenting an exemplary training set generation procedure executed by the transliteration device according to an embodiment of the present invention;

FIG. 6A is an illustration presenting an exemplary basic transliteration table;

FIG. 6B is an illustration presenting an exemplary first transliteration table;

FIG. 6C is an illustration presenting an exemplary second transliteration table;

FIG. 6D is an illustration presenting an exemplary third transliteration table;

FIG. 8A is an illustration presenting an exemplary basic rewriting table;

FIG. 8B is an illustration presenting an exemplary first rewriting table;

FIG. 8C is an illustration presenting an exemplary second rewriting table;

FIG. 8D is an illustration presenting an exemplary third rewriting table;

FIG. 9 is an illustration presenting an exemplary table of number of times of rewriting;

FIG. 12A is an illustration for explaining change of the transliteration probability due to execution of the procedure according to an EM algorithm;

FIG. 12B is an illustration for explaining change of the weighted transliteration probability;

FIG. 12C is an illustration for explaining change of the rewriting probability;

FIG. 13B is an illustration presenting an exemplary results display screen displayed by the terminal device according to Modified Embodiment 2;

MODE FOR CARRYING OUT THE INVENTION

Figure 2B:
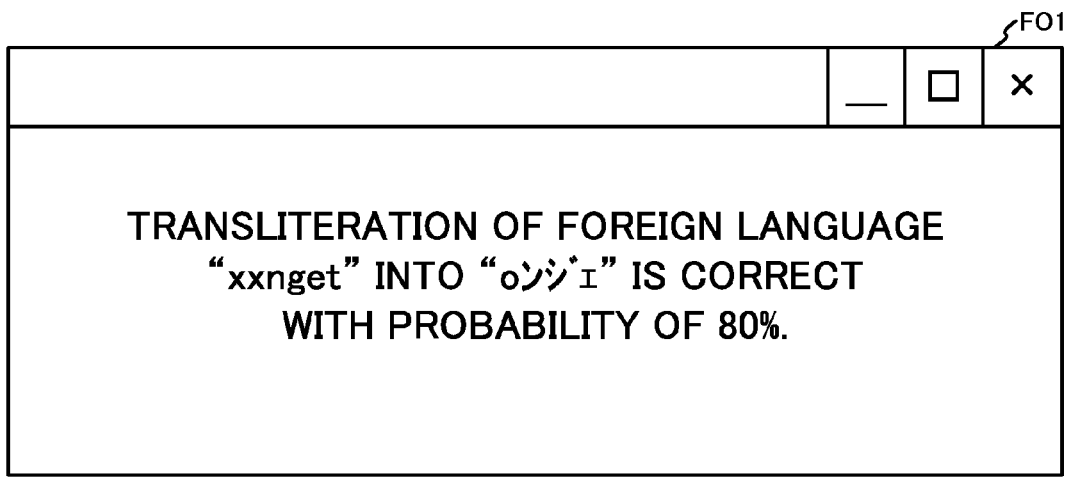
FIG. 2B is an illustration presenting an exemplary results display screen displayed by the terminal device.

An embodiment of the present invention will be described hereafter with reference to the drawings.

A transliteration system 1 shown in FIG. 1 is composed of a computer communication network 10 (the communication network 10, hereafter), a transliteration device 100 of the present invention, a terminal device 200, a Japanese language database server (the Japanese DB server, hereafter) 301, and a foreign language database server (the foreign language DB server, hereafter) 302.

The communication network 10 is composed of, for example, the Internet. The communication network 10 can be a LAN (local area network) or public line network.

Prior to explaining the transliteration device 100, the terminal device 200, the Japanese DB server 301, and the foreign language DB server 302 will be described.

The terminal device 200 is composed of, for example, a personal computer comprising a display part such as an LCD (liquid crystal display) and an input part such as a keyboard. The terminal device 200 displays an input screen FI1 as shown in FIG. 2A to urge input of an input pair. The input pair is a pair consisting of a first string spelled in any original language and a second string spelled in a given target language and considered by the user to be the string transliterated from the first string.

Here, transliteration means phonetic translation between languages utilizing different orthographic systems such as translation between "Barak Obama" and "バラクオバマ." This embodiment will be described on the premise that the given target language is the Japanese language and any original language is any language using alphabets in writing including English, French, Spanish, German, Polish, and Russian. However, this is not restrictive.

The original language of a first string is the language ruling the reading of the first string. A case in which the first string is "monget" and this string constitutes a character trademark is discussed by way of example. If the user of this trademark requires the seller and/or advertizing company of products with this trademark to pronounce the character trademark "モンジェ" in French reading, the original language of this first string is French. Another case in which the first string is "Monet" and this string presents the name of a French person is discussed by way of example. In this case, the first string "Monet" is pronounced "モネ" in French and, therefore, the original language of this first string is French. In other words, the original language of a first string can be a language specified by the user of the first string or a language requisitely determined by the content presented by the first string. However, the original language is not the language from which a string derives such as an English word "etc" deriving from the Latin phrase "et cetera."

After displaying the input screen FI1 of FIG. 2A, the terminal device 200 enters various signals corresponding to operation of the user into the transliteration system 1, generates an input pair based on the entered signals, and sends information presenting the generated input pair to the transliteration device 100. Subsequently, the terminal device 200 receives information returned from the transliteration device 100, and displays a results display screen FO1 as shown in FIG. 2B based on the received information. Subsequently, the terminal device 200 displays on the results display screen FO1 the first string and the second string forming the input pair and the probability that the second string is transliteration of the first string.

The Japanese DB server 301 and the foreign language DB server 302 have databases managing information presenting the description pages of an online encyclopedia that unspecific users are allowed to edit such as Wikipedia (registered trademark) and DBpedia. Furthermore, the Japanese DB server 301 and the foreign language DB server 302 release information managed with the databases on the Internet. Here, the Japanese DB server 301 manages and releases information presenting the description pages in the Japanese language and the foreign language DB server 302 manages and releases information presenting the description pages in foreign languages. The Japanese description pages released by the Japanese DB server 301 carry the URLs (uniform resource locators) of the foreign language description pages (the corresponding pages, hereafter) describing the same things or persons as those in the Japanese description pages.

The transliteration device 100 is a server machine on which web server software is installed. The transliteration device 100 receives information presenting an input pair from the terminal device 200, calculates the probability that the paired inputs presented by the received information have a transliteration relationship, and returns information presenting the calculated probability to the terminal device 200.

The transliteration device 100 is composed of, as shown in FIG. 3, a CPU (central processing unit) 100a, a ROM (read only memory) 100b, a RAM (random access memory) 100c, a hard disc 100d, a media controller 100e, a LAN card (local area network) 100f, a video card 100g, a LCD (liquid crystal display) 100h, a keyboard 100i, a speaker 100j, and a mouse 100k.

The CPU 100a executes software procedures according to programs stored in the ROM 100b or hard disc 100d to control the entire transliteration device 100. The RAM 100c temporarily stores data to be processed while the CPU 100a executes programs.

The hard disc 100d is an information storage storing tables in which various data are saved. Here, the transliteration device 100 can comprise a flash memory instead of the hard disc 100d.

The media controller 100e reads various data and programs from recording media including flash memories, CDs (compact discs), DVDs (digital versatile discs), and Blue-ray discs (registered trademark).

The LAN card 100f transmits/receives data to/from the terminal device 200, the Japanese DB server 301, and the foreign language DB server 302 connected via the communication network 10. The keyboard 100i and mouse 100k enter signals according to the operation of the user. The LAN card 100f constitutes an information acquisition part, a reception part, and a probability output part.

The video card 100g draws (namely, renders) images based on digital signals output from the CPU 100a and outputs image signals presenting the drawn images. The LCD 100h displays images according to the image signals output from the video card 100g. The transliteration device 100 can comprise a PDP (plasma display panel) or EL (electroluminescence) display instead of the LCD 100h. The speaker 100j outputs sound based on the signals output from the CPU 100a.

Figure 5:
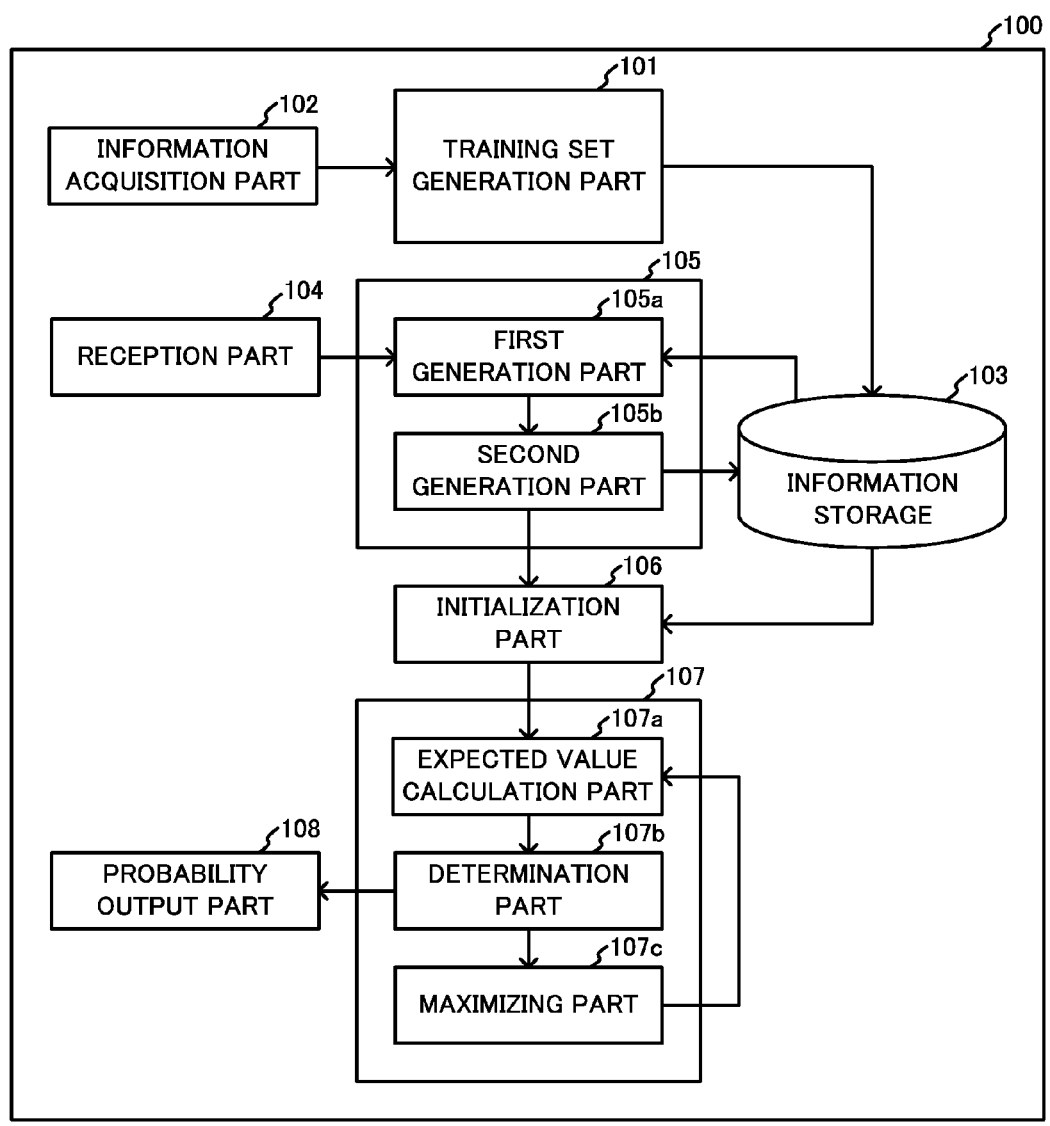
FIG. 5 is a block diagram presenting exemplary functions exerted by the transliteration device according to an embodiment of the present invention.

The CPU 100a of the transliteration device 100 executes a training set generation procedure of FIG. 4 using the hardware of FIG. 3 so as to function as a training set generation part 101 as shown in FIG. 5. The CPU 100a further functions as an information acquisition part 102 in cooperation with the LAN card 100f. The CPU 100a further functions as an information storage 103 in cooperation with the hard disc 100d.

Prior to explaining the training set generation procedure of FIG. 4, a table stored in the information storage 103 for saving data to be used in the training set generation procedure will be described.

The information storage 103 stores a basic transliteration table as shown in FIG. 6A. The basic transliteration table of FIG. 6A is used for generating the first to third transliteration tables shown in FIGS. 6B to 6D. The first to third transliteration tables will be described later.

The basic transliteration table of FIG. 6A associates and saves information presenting an original spelling string $s_n$ spelled in any original language, information presenting a target spelling string $t_n$ spelled in a given target language and transliterated from the spelling string $s_n$, information presenting a number (transliteration pair number, hereafter) n for identifying a pair consisting of the original spelling string $s_n$ and target spelling string $t_n$ (a transliteration pair, hereafter), and information presenting the transliteration probability $P_{\alpha\beta}(s_n|t_n)$ that the original spelling string $s_n$ is transliterated into the target spelling string $t_n$.

More specifically, the transliteration pair identified by a transliteration pair number "1" consists of an original spelling string "flextime" and a target spelling string "フレックスタイム." Here, a set of which the elements are transliteration pairs presented by multiple pieces of information saved in the basic transliteration table of FIG. 6A is termed the training set.

After the training set generation procedure of FIG. 4 starts, the training set generation part 101 empties the training set and substitutes "1" for a variable n presenting the number of transliteration pairs added to the training set (which is equal to the transliteration pair number) to initialize the variable n (Step S01). Then, the information acquisition part 102 of FIG. 5 acquires from the Japanese DB server 301 information that presents any description page constituting a Japanese online encyclopedia and that has not been acquired previously (Step S02). Then, the training set generation part 101 acquires from the description page presented by the acquired information a Japanese string posted as an entry word on that description page (Step S03).

Subsequently, the training set generation part 101 determines whether the acquired Japanese string is transliteration from a string in another language (namely, a foreign language) based on whether the Japanese string consists of only Katakana (Step S04). This is because a word from a foreign language is written using only Katakana in the Japanese language.

If it is determined in the Step S04 that the acquired Japanese string is not transliterated (Step S04; No), the training set generation part 101 returns to the Step S02 and repeats the above processing. Conversely, if it is determined that the acquired Japanese string is transliterated (Step S04; Yes), the training set generation part 101 determines whether the acquired Japanese string is a proper name (Step S05). The determination method in the Step S05 can consist of, for example, determining whether the acquired Japanese string is equal to a proper name presented by information stored in the information storage 103 in advance, or any other known method can be used.

If it is determined in the Step S05 that the acquired Japanese string is not a proper name (Step S05; No), the training set generation part 101 repeats the above processing from the Step S02. This is because the entry words of a description page generally consist of strings presenting proper names such as the names of things or persons described on the description page; therefore, if a string acquired from an entry word is not a proper name, it is highly possible that the string was not acquired properly.

If it is determined in the Step S05 that the acquired Japanese string is a proper name (Step S05; Yes), the training set generation part 101 extracts from the Japanese description page acquired in the Step S02 the URL of a corresponding page (namely, the corresponding page of a foreign online encyclopedia) corresponding to that Japanese description page. Then, the training set generation part 101 acquires information presenting the page based on the extracted URL from the foreign language DB server 302 (Step S06).

Here, the above explanation is made on the assumption that a Japanese description page carries the URL of a corresponding foreign language page describing the same thing or person as the Japanese description page and the training set generation part 101 extracts the URL of the corresponding page that is posted on the Japanese description page in advance. However, this is not restrictive. For example, the training set generation part 101 can acquire a URL of a corresponding foreign language page by changing the subdomain "jp" included in the URL of the Japanese description page and identifying the country where the Japanese DB server 301 is located to "en," "de," or "fr."

After the Step S06, the training set generation part 101 acquires from the description page presented by the acquired information a foreign language string posted as an entry word on that description page (Step S07). Then, the training set generation part 101 removes parentheses and the string in the parentheses from the acquired Japanese string and the foreign language string. This is for removing noise such as descriptions in parentheses after the name when there are several well-known persons with the same name such as YAMADA XX (comedian).

Subsequently, the training set generation part 101 designates the Japanese string acquired in the Step S03 as an original spelling string $s_n$ and the foreign language string acquired in the Step S07 as a target spelling string $t_n$. Then, the training set generation part 101 generates a transliteration pair consisting of the original spelling string $s_n$ and target spelling string $t_n$ (Step S08), and adds the transliteration pair to the training set (Step S09). Subsequently, the training set generation part 101 associates and saves in the basic transliteration table of FIG. 6A information presenting the transliteration number n of the transliteration pair, information presenting the original spelling string $s_n$, and information presenting the target spelling string $t_n$ forming the transliteration pair (Step S10).

Subsequently, the training set generation part 101 increments the value of the variable n presenting the transliteration number by "1" (Step S11), and determines whether the value of the variable n is equal to or greater than a given value m (Step S12). Here, information presenting the given value m is stored in the information storage 103 of FIG. 5. This embodiment is described on the assumption that the given value m is "11,000." However, this is not restrictive and a person of ordinary skill in the field can determine a suitable value by experiments.

If it is determined in the Step S12 that the value of the variable n is lower than a given value m (Step S12; No), the training set generation part 101 repeats the above processing from the Step S02. On the other hand, if it is determined that the value of the variable n is equal to or greater than a given value m (Step S12; Yes), the training set generation part 101 ends the execution of the training set generation procedure.

Figure 7:
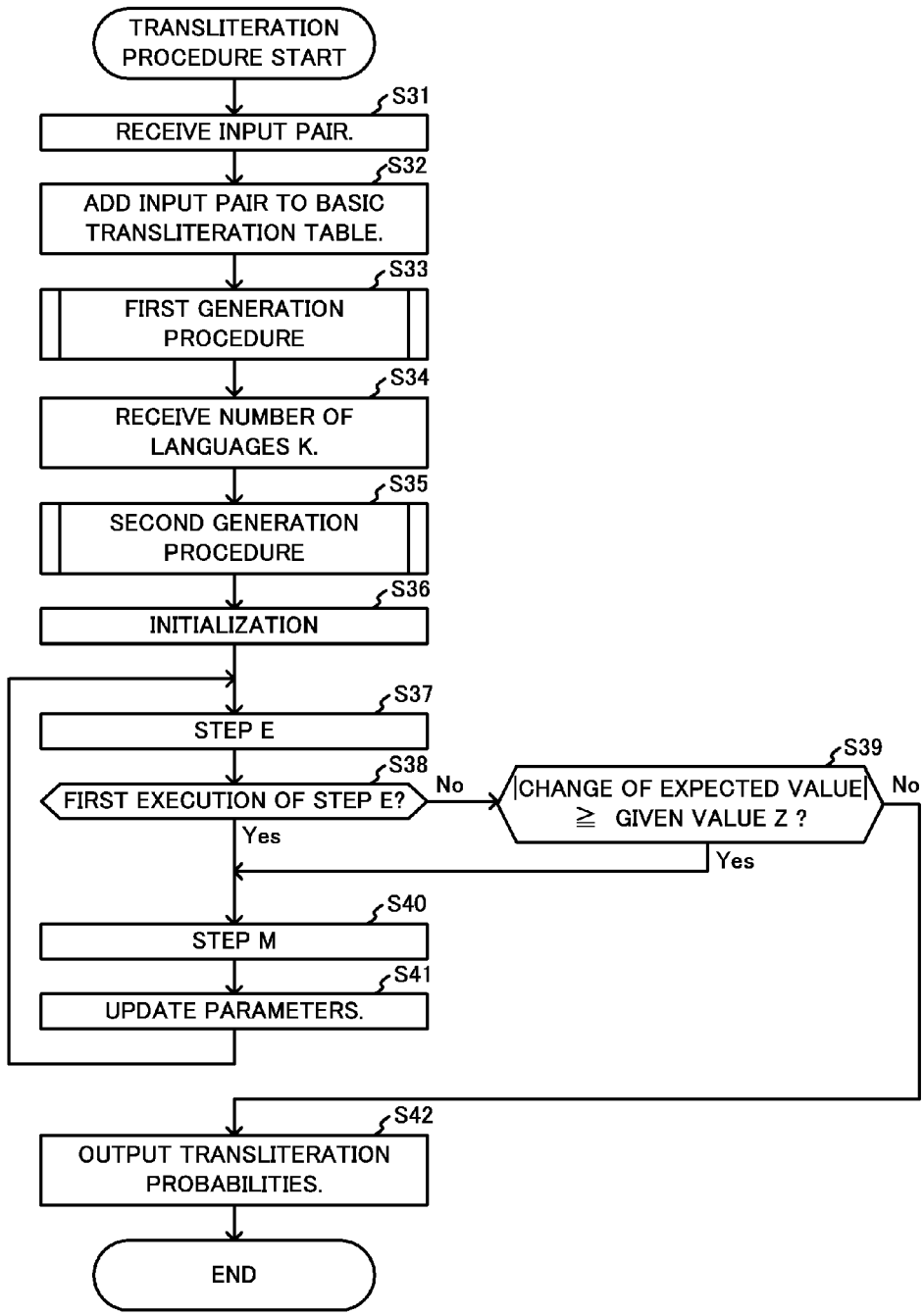
FIG. 7 is a flowchart presenting an exemplary transliteration procedure executed by the transliteration device.

The CPU 100a of the transliteration device 100 further functions as a generation part 105 having a first generation part 105a and a second generation part 105b, an initialization part 106, and an update part 107 having an expected value calculation part 107a, a determination part 107b, and a maximizing part 107c as shown in FIG. 5 by executing a transliteration procedure of FIG. 7 using the hardware of FIG. 3. The CPU 100a further functions as a probability output part 108 in cooperation with the LAN card 100f.

Prior to explaining the transliteration procedure of FIG. 7, a table stored in the information storage 103 for saving information to be used in execution of the transliteration procedure will be described.

The information storage 103 stores a basic rewriting table as shown in FIG. 8A. The basic rewriting table of FIG. 8A is used for generating the first to third rewriting tables of FIGS. 8B to 8D. The first to third rewriting tables will be described later.

The basic rewriting table of FIG. 8A associates and saves information presenting a segment (an original segment, hereafter) α of an original spelling string $s_n$ presented by information saved in the basic transliteration table of FIG. 6A, information presenting a segment (a transliterated segment, hereafter) β of a target spelling string $t_n$ transliterated from the original spelling string that corresponds to the original segment α, information presenting a segment pair number j identifying a pair consisting of the original segment α and translated segment β (a segment pair, hereafter), and information presenting the probability that the original segment α is rewritten as the translated segment β for transliteration (a rewriting probability, hereafter). Here, the original segment and transliterated segment can consist of one character or a string of two or more characters.

More specifically, the segment pair identified by a segment pair number "1" consists of an original segment α of "^f" and a transliterated segment β of "^フ." The segment pair identified by a segment pair number "5" consists of an original segment α of "get$" and a transliterated segment β of "ジェ ッ $." The segment pair identified by a segment pair number "6" consists of an original segment α of "get$" and a transliterated segment β of "ゲット$." The same original segment "get$" is associated with the different transliterated segments "ジェ$" and "ゲット$" because the training set includes the following two transliteration pairs. One transliteration pair consists of an original spelling string $s_n$ ending with "get$" and a target spelling string $t_n$ transliterated from the original spelling string $s_n$ based on the French reading phonetics. The other transliteration pair consists of an original spelling string $s_n$ ending with "get$" and a target spelling string $t_n$ transliterated from the original spelling string $s_n$ based on the English reading phonetics. Here, a symbol "^" indicates that the immediately subsequent character is the first character of a string and a symbol "$" indicates that the immediately preceding character is the last character of a string.

Furthermore, the information storage 103 stores a table of the number of times of rewriting as shown in FIG. 9. The table of the number of times of rewriting of FIG. 9 associates and saves information presenting a transliteration pair number n, information presenting a segment pair number j, and information presenting the number of times of rewriting $f_n(\alpha \to \beta)$. The number of times of rewriting $f_n(\alpha \to \beta)$ is the number of times of rewriting an original segment $\alpha$ to a transliterated segment $\beta$ of a segment pair identified by a segment pair number j for transliterating an original spelling string $s_n$ forming a transliteration pair identified by a number n into a target spelling string $t_n$ forming the transliteration pair.

More specifically, the number of times of rewriting an original segment "le" to a transliterated segment "レ" forming a segment pair identified by a segment pair number "2" for transliterating an original spelling string "flextime" into a target spelling string "フレックスタイム" forming a transliteration pair identified by a transliteration pair number "1" is "1." On the other hand, the number of times of rewriting an original segment "le" to a transliterated segment "ル" of a segment pair identified by a segment pair number "3" for transliterating an original spelling string "flextime" into a target spelling string "フレックス タイム" is "0." Furthermore, the number of times of rewriting an original segment "ma" to a transliterated segment "マ" of a segment pair identified by a segment pair number "100" for transliterating an original spelling string "mama" into a target spelling string "マア" of a transliteration pair identified by a transliteration pair number "9" is "2."

As the transliteration procedure of FIG. 7 starts, the reception part 104 of FIG. 5 receives an input pair presented by information sent from the terminal device 200 (Step S31). Then, the generation part 105 regards the received input pair as a transliteration pair. Subsequently, the generation part 105 adds the transliteration pair to the training set, gives the transliteration pair a transliteration pair number m+1, and updates the variable N presenting the number of transliteration pairs belonging to the training set to m+1. Then, the generation part 105 associates and additionally saves in the basic transliteration table of FIG. 6A information presenting the transliteration pair number N and information presenting the transliteration pair (Step S32).

Figure 10:
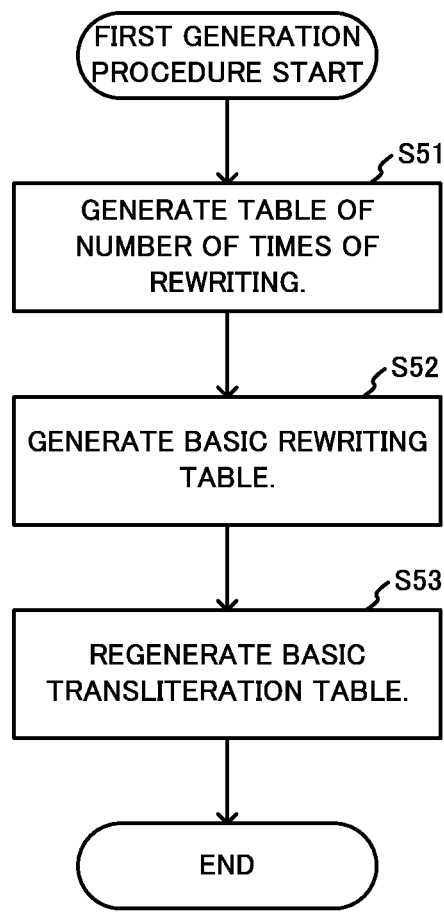
FIG. 10 is a flowchart presenting an exemplary first generation procedure executed by the transliteration device.

Subsequently, the first generation part 105a of the generation part 105 executes a first generation procedure as shown in FIG. 10 (Step S33).

As the first generation procedure of FIG. 10 starts, the first generation part 105a makes reference to the basic transliteration table of FIG. 6A, acquires the transliteration pairs included in the training set, and generates the table of the number of times of rewriting of FIG. 9 using the acquired transliteration pairs (Step S51). More specifically, the first generation part 105a retrieves all transliteration pairs from the training set. Then, the first generation part 105a adds a special character "^" at the head of the original spelling string $s_n$ forming each transliteration pair and a special character "$" at the end thereof. Subsequently, the first generation part 105a divides the string $s_n$ with the additional special characters to generate original segments $\alpha$.

Here, if the original spelling string $s_n$ has a length A (namely, the original spelling string $s_n$ consists of a string of A characters), the original spelling string $s_n$ can be divided in $2^{(A-1)}-1$ different ways of dividing S. The first generation part 105a divides the original spelling string $s_n$ in all ways of dividing S to generate all possible original segments $\alpha$. Furthermore, the first generation part 105a generates a set Part $(s_n)$ of which the elements are all ways of dividing S of the above spelling string $s_n$. Similarly, the first generation part 105a identifies all ways of dividing T of the target spelling string $t_n$ and generates a set Part $(t_n)$ of which the elements are the identified all ways of dividing T. Subsequently, the first generation part 105a divides the target spelling string $t_n$ in all ways of dividing T to generate all possible transliterated segments $\beta$.

Subsequently, the first generation part 105a generates all combinations of the original segments $\alpha$ and transliterated segments $\beta$, and calculates the above number of times of rewriting $f_n(\alpha \to \beta)$ for each of the generated combinations. Then, the first generation part 105a associates and saves in the table of number of times of rewriting of FIG. 9 information presenting the calculated number of times of rewriting $f_n(\alpha \to \beta)$, information presenting the transliteration pair number n, and information presenting the segment pair number j of a segment pair consisting of an original segment $\alpha$ and a transliterated segment $\beta$.

After the Step S51 of FIG. 10, the first generation part 105a generates a basic rewriting table of FIG. 8A based on the table of number of times of rewriting of FIG. 9 (Step S52). More specifically, the first generation part 105a applies the calculated number of times of rewriting $f_n(\alpha \to \beta)$ to the formula (1) below to calculate the rewriting probability $P(\alpha \to \beta)$ that an original segment $\alpha$ is rewritten as a transliterated segment $\beta$.

[Equation 1]

$$P(\alpha \to \beta) = \sum_{n=1}^{N} \frac{f_n(\alpha \to \beta)}{\sum_{\alpha \to \beta} f_n(\alpha \to \beta)} \quad (1)$$

Subsequently, the first generation part 105a associates and saves in the basic rewriting table of FIG. 8 information presenting the calculated rewriting probability $P(\alpha \to \beta)$ and information presenting the segment pair number j of a segment pair consisting of an original segment $\alpha$ and a transliterated segment $\beta$.

After the Step S52 of FIG. 10, the first generation part 105a regenerates the basic transliteration table of FIG. 6A based on the basic rewriting table of FIG. 8A (Step S53), and then ends the execution of the first generation procedure. More specifically, first, the first generation part 105a focuses on an unprocessed transliteration pair among the transliteration pairs belonging to the training set. Then, the first generation part 105a executes the αβ method on the transliteration pair the focus is on (the focused transliteration pair, hereafter) by applying the original spelling string $s_n$ and target spelling string $t_n$ forming the focused transliteration pair and the calculated rewriting probability $P(\alpha \to \beta)$ to the formula (2) below. Here, the method of executing the αβ method is described in the Non-Patent Literature 2 in detail and therefore its explanation is omitted. The present specification incorporates the content of the Non-Patent Literature 2 by reference.

[Equation 2]

$$P_{\alpha\beta}(t_n \mid s_n) = \max_{T \in Part(t_n), S \in Part(s_n)} \prod_{i=1}^{|s|} P(\alpha_i \to \beta_i) \quad (2)$$

In the above, T presents a way of dividing a target spelling string $t_n$ and Part ($t_n$) is a set of which the elements are all ways of dividing T. Similarly, S presents a way of dividing an original spelling string $s_n$ and Part ($s_n$) is a set of which the elements are all ways of dividing S. Furthermore, |S| presents the number of original segments α generated when an original spelling string $s_n$ is divided in the ways of dividing S. Furthermore, $\alpha_i$ presents an i-th original segment from the first one generated by dividing an original spelling string $s_n$ in the ways of dividing S. $\beta_i$ presents an i-th transliterated segment from the first one generated by dividing a target spelling string $t_n$ in the ways of dividing T.

Executing the αβ method, the first generation part 105a calculates the transliteration probability $P_{\alpha\beta}$ ($s_n|t_n$) that the original spelling string $s_n$ is transliterated into the target spelling string $t_n$ forming the focused transliteration pair. Then, the first generation part 105a associates and saves in the basic transliteration table of FIG. 6A information presenting the calculated transliteration probability $P_{\alpha\beta}$ ($s_n|t_n$) and information presenting the transliteration pair number n of the focused transliteration pair. Subsequently, the first generation part 105a repeats the above processing until no unprocessed transliteration pair is left.

After the Step S33 of FIG. 7, the reception part 104 of FIG. 5 receives the number of languages K presented by information sent from the terminal device 200 (Step S34). The number of languages K is a value presenting into how many classes the original spelling strings $s_n$ forming multiple transliteration pairs belonging to the training set are implicitly (namely, not explicitly) classified according to the original language. More specifically, a case in which the original languages of multiple original strings $s_n$ in the training set are English, French, Spanish, German, Polish, or Russian is discussed. In such a case, if the received number of languages K is "6," the multiple original spelling strings $s_n$ are implicitly classified into six, English, French, Spanish, German, Polish, and Russian, classes according to their original language in many cases.

On the other hand, if the received number of languages K is "3," the multiple original spelling strings $s_n$ are implicitly classified into linguistically relative classes such as English/German, French/Spanish, and Polish/Russian classes in many cases. This is because original spelling strings $s_n$ originating from the linguistically relative classes are orthographically and phonetically more similar to each other than to strings $s_n$ originating from other languages.

Here, the original languages of the original spelling strings $s_n$ implicitly classified into the same class such as French and Spanish are collectively termed the implicit language. This embodiment is explained on the assumption that the number of implicit languages K is "3." However, this is not restrictive. "Three" implicit languages are identified by language numbers "1," "2," and "3." The implicit languages identified by the language numbers "1," "2," and "3" are termed the first language, second language, and third language. In this embodiment, the language number z is an implicit variable, and the implicit language identified by a language number z is not specified for a particular language.

Figure 11:
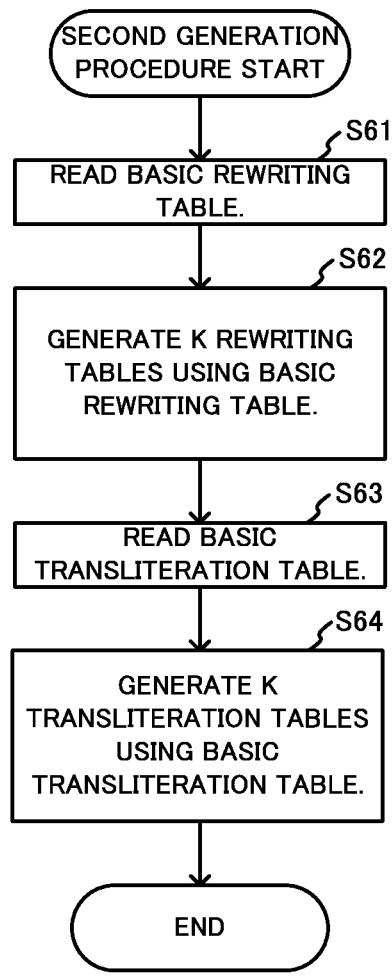
FIG. 11 is a flowchart presenting an exemplary second generation procedure executed by the transliteration device.

After the Step S34 of FIG. 7, the second generation part 105b of FIG. 5 executes a second generation procedure as shown in FIG. 11.

After the second generation procedure of FIG. 11 starts, the second generation part 105b reads the basic rewriting table of FIG. 8A (Step S61). Subsequently, the second generation part 105b makes K copies of the read basic rewriting table to generate K, first to k-th, rewriting tables (Step S62). More specifically, the second generation part 105b generates a first rewriting table associating and storing information presenting a number j identifying a segment pair saved in the basic rewriting table of FIG. 8A, information presenting the original segment α forming the segment pair, information presenting the transliterated segment β forming the segment pair, and information presenting a rewriting probability P (α→β|z=1). The rewriting probability P (α→β|z=1) is the probability that the original segment α is rewritten as the transliterated segment β under the condition that the original language of the original spelling string $s_n$ including the original segment α is the first language. Similarly, the second generation part 105b generates a second rewriting table saving information presenting the rewriting probability P (α→β|z=2) and a third rewriting table saving information presenting the rewriting probability P (α→β|z=3).

After the Step S62, the second generation part 105b reads the basic transliteration table of FIG. 6A (Step S63). Subsequently, the second generation part 105b makes K copies of the read basic transliteration table to generate K, first to k-th, transliteration tables (Step S64), and ends the execution of the second generation procedure. More specifically, the second generation part 105b generates a first transliteration table associating and saving information presenting a number n identifying a transliteration pair saved in the basic transliteration table, information presenting the original spelling string $s_n$ forming the transliteration pair, information presenting the target spelling string $t_n$ forming the transliteration pair, and information presenting a transliteration probability P ($t_n|s_n$, z=1) as shown in FIG. 6B. The transliteration probability P ($t_n|s_n$, z=1) is the probability that the original spelling string $s_n$ is transliterated into the target spelling string $t_n$ under the condition that the original language of the original spelling string $s_n$ is the first language. Similarly, the second generation part 105b generates a second transliteration table saving information presenting the transliteration probability P ($t_n|s_n$, z=2) as shown in FIG. 6C and a third transliteration table saving information presenting the transliteration probability P ($t_n|s_n$, z=3) as shown in FIG. 6D.

Here, the second generation part 105b alters the transliteration probabilities P ($t_n|s_n$, z=1), P ($t_n|s_n$, z=2), and P ($t_n|s_n$, z=3) so that they are different from each other by a given or more quantity. This is because the Steps E and M of an EM (expectation maximization) algorithm described later will not repeatedly be executed if these transliteration probabilities are not different from each other by a given or more quantity. This embodiment is explained on the assumption that the second generation part 105b sets the transliteration probabilities P ($t_n|s_n$, z=1), P ($t_n|s_n$, z=2), and P ($t_n|s_n$, z=3) associated with information presenting the same transliteration pair number n to the transliteration probability $P_{\alpha\beta}$ ($t_n|s_n$) associated with information presenting the transliteration pair number n plus, minus, multiplied by, or divided by a random value. However, this is not restrictive. The transliteration probabilities P ($t_n|s_n$, z=1) to P ($t_n|s_n$, z=3) can be set to values different from the transliteration probability $P_{\alpha\beta}$ ($t_n|s_n$) by given different quantities for K=3 languages, respectively.

After the Step S35 of FIG. 7, the initialization part 106 of FIG. 5 executes an initialization procedure to initialize parameters used for executing an EM algorithm described later (Step S36). More specifically, the initialization part 106 initializes each weighting parameter $\pi_k$ presenting the ratio of the original spelling strings $s_n$ of which the original language is the implicit language identified by a language number k among the N original spelling string $s_n$ forming the transliteration pairs belonging to the training set to a given value "1/k."

Here, information presenting the given value is stored in the information storage 103. Furthermore, the initial value of the weighting parameter $\pi_k$ presented by this information is not limited to "1/k" and a person of ordinary skill in the field can determine a suitable value by experiments. Here, a weighting parameter $\pi_1$ is the weighting parameter for the first transliteration table shown in FIG. 6B. Similarly, a weighting parameter $\pi_2$ is the weighting parameter for the second transliteration table shown in FIG. 6C and a weighting parameter $\pi_3$ is the weighting parameter for the third transliteration table shown in FIG. 6D.

After the Step S36, the expected value calculation part 107a of FIG. 5 executes the Step E of an EM algorithm (Step S37). More specifically, the Step E consists of Steps 1E to 3E. The expected value calculation part 107a executes only the Steps 2E and 3E among the Steps 1E to 3E constituting the Step E when the Step E is executed for the first time. On the other hand, the expected value calculation part 107a executes the Steps 1E to 3E when the Step E is executed for the second and subsequent times. This is because the Step 1E is a process to calculate the transliteration probabilities $P(t_n|s_n, z=1)$ to $P(t_n|s_n, z=3)$ by the αβ method using the rewriting probabilities $P(\alpha \rightarrow \beta|z=1)$ to $P(\alpha \rightarrow \beta|z=3)$. Therefore, the processing corresponding to the first execution of the Step 1E is the processing of the Step S53 of FIG. 10 and the Step S64 of FIG. 11, which was already executed.

After the Step 1E starts, the expected value calculation part 107a focuses on the first language having a language number "1" and designates the first language as the focused language. Then, the expected value calculation part 107a makes reference to the rewriting probability $P(\alpha \rightarrow \beta|z=1)$ in the first rewriting table of FIG. 8B corresponding to the focused language. Subsequently, the expected value calculation part 107a focuses on an unprocessed transliteration pair presented by information saved in the first transliteration table of FIG. 6B. Subsequently, the expected value calculation part 107a executes the αβ method by applying the original spelling string $s_n$ and target spelling string $t_n$ forming the transliteration pair the focus is on (the focused transliteration pair, hereafter) and the referred rewriting probability $P(\alpha \rightarrow \beta|z=1)$ to the formula (3) below.

[Equation 3]

$$P(t_n | s_n, z) = \max_{T \in Part(t_n), S \in Part(s_n)} \prod_{i=1}^{|S|} P(\alpha_i \rightarrow \beta_i | z) \quad (3)$$

In the above, S and T, Part ($s_n$) and Part ($t_n$), |S|, $\alpha_i$, and $\beta_i$ are the same as those used in the above formula (2) and their explanation is omitted.

With execution of the αβ method using the above formula (3), the transliteration probability $P(t_n|s_n, z=1)$ of the focused transliteration pair is calculated and the first transliteration table of FIG. 6B is updated using information presenting the calculated value. Subsequently, the expected value calculation part 107a repeats the above processing until there is no more unprocessed transliteration pair, and then repeats the above processing for the second language identified by a language number "2" as the focused language. Subsequently, the expected value calculation part 107a repeats the above processing for the third language identified by a language number "3" as the focused language, and then ends the Step 1E.

In the Step 2E, the expected value calculation part 107a calculates an expected value $\gamma_{nk}$ of a random variable $z_{nk}$ (namely, E $[z_{nk}]$) for all transliteration pair numbers n and all language numbers k using the formula (4) below. The random variable $z_{nk}$ is "1" when the original language of the original spelling string $s_n$ of the transliteration pair identified by a transliteration pair number n is the implicit language identified by a language number k and otherwise "0." Here, the expected value $\gamma_{nk}$ is a weighted transliteration probability of the transliteration probability $(t_n|s_n, z=1)$ weighed with the weighting parameter $\pi_k$, and also the probability that the original language of the original spelling string $s_n$ is the implicit language identified by a language number k (the origin probability, hereafter).

[Equation 4]

$$\gamma_{n,k} = \frac{\pi_k P(t_n | s_n, z = k)}{\sum_{k=1}^{K} \pi_k P(t_n | s_n, z = k)} \quad (4)$$

In the Step 3E, the expected value calculation part 107a calculates an expected value Q of a likelihood function L using the expected value $\gamma_{nk}$. Here, the likelihood function L is a function for calculating likelihood and presented by the formula (5) below. The likelihood calculated by this likelihood function L presents the likelihood of the first to third transliteration tables shown in FIGS. 6B to 6D, respectively, in a transliteration model in which multiple transliteration pairs, namely elements in the training set, are implicitly classified based on three implicit languages having language numbers "1" to "3" provided that a training set is obtained (namely, observed).

[Equation 5]

$$L = \sum_{n=1}^{N} \sum_{k=1}^{K} \pi_k P(t_n | s_n, z = k) \quad (5)$$

After the Step S37 of FIG. 7, the determination part 107b of FIG. 5 determines whether this is the first time of the expected value Q of the likelihood function L being calculated (in other words, whether the Step E is executed for the first time) (Step S38). If it is determined that this is not the first time of the expected value Q of the likelihood function L being calculated (Step S38; No), the update part 107 calculates the absolute value of the change from the expected value Q of the likelihood function L calculated last time to the expected value Q of the likelihood function L calculated this time. Then, the update part 107 determines whether the calculated absolute value of the change is equal to or greater than a given value Z (Step S39). Here, information presenting the given value Z is stored in the information storage 103 of FIG. 5 and a person of ordinary skill in the field can determine a suitable given value Z by experiments. Here, the absolute value of the change is used for the determination. Instead of the absolute value, the ratio can be used for the determination. For example, it can be determined whether the ratio of the expected value Q of the likelihood function L calculated this time to the expected value Q of the likelihood function L calculated last time is equal to or greater than a given value Z or whether the ratio of the expected value $\gamma_{nk}$ calculated this time to the expected value $\gamma_{nk}$ calculated last time is equal to or greater than a given value Z.

If the update part 107 determines in the Step S38 that this is the first time of the expected value Q of the likelihood function L being calculated (Step S38; Yes), or that the absolute value of the change of the expected value Q is equal to or greater than a given value Z (Step S39; Yes), the maximizing part 107c of FIG. 5 executes a Step M of maximizing the expected value Q of the likelihood function L (Step S40).

More specifically, the maximizing part 107c applies the number of times of rewriting $f_n$ ($\alpha \to \beta$) presented by information saved in the table of the number of times of rewriting of FIG. 9 and the expected value $\gamma_{nk}$ calculated in the Step S37 (namely, the Step E) of FIG. 7 to the formulae (6) and (7) below. In this way, the maximizing part 107c calculates a weighting parameter $\pi_k^*$ and a transliteration probability P $(t_n|s_n, z=k)^*$ maximizing the expected value Q of the likelihood function L for all transliteration pair numbers n and language numbers k.

[Equation 6]

$$\pi_k^* = \frac{N_k}{N}, N_k = \sum_{n=1}^{N} \gamma_{nk} \quad (6)$$

[Equation 7]

$$P(\alpha \to \beta | z = k)^* = \frac{1}{N_k} \sum_{n=1}^{N} \gamma_{nk} \frac{f_n(\alpha \to \beta)}{\sum_{\alpha \to \beta} f_n(\alpha \to \beta)} \quad (7)$$

After the Step S40 of FIG. 7, the update part 107 executes a parameter update process (Step S41). In the parameter update process, the update part 107 updates the weighting parameter $\pi_k$ used for calculating the expected value Q of the likelihood function L in the Step S37 to the optimum weighting parameter $\pi_k^*$(namely, the optimum solution maximizing the expected value Q of the likelihood function L) calculated in the Step S40. Furthermore, the update part 107 updates information presenting the transliteration probabilities P $(t_n|s_n, z=1)$ to P $(t_n|s_n, z=3)$ saved in the first to third transliteration tables of FIGS. 6B to 6D to information presenting their optimum transliteration probabilities P $(t_n|s_n, z=1)^*$ to P $(t_n|s_n, z=3)^*$. Subsequently, the above processing is repeated from the Step S37.

If the determination part 107b determined that the absolute value of the change from the expected value Q of the likelihood function L calculated last time to the expected value Q of the likelihood function L calculated this time is lower than a given value Z (Step S39; No), a transliteration probability output process is executed (Step S42). In the transliteration probability output process, the probability output part 108 of FIG. 5 makes reference to information presenting the transliteration probabilities P $(t_N|s_N, z=1)$ to P $(t_N|s_N, z=3)$ associated with information presenting a number N identifying an input pair in the first transliteration table of FIG. 6B to the third transliteration table of FIG. 6D. Subsequently, the probability output part 108 outputs (namely, transmits) to the terminal device 200 information presenting the highest transliteration probability among the referred transliteration probabilities P $(t_N|s_N, z=1)$ to P $(t_N|s_N, z=3)$. After executing the transliteration probability output process, the probability output part 108 ends the execution of the transliteration procedure.

The change of the rewriting probability P $(\alpha \to \beta|z=1)$, transliteration probability P $(t_n|s_n, z=1)$, and weighted transliteration probability (namely, the expected value of the random variable $z_{nk}$ and the origin probability) $\gamma_{nk}$ accompanying the execution of the EM algorithm will be discussed hereafter.

It is assumed that in the Step S62 of FIG. 11, the rewriting probability P $(\alpha \to \beta|z=1)$ that an original segment "get$" is rewritten as a transliterated segment "ジェ I $" forming a segment pair identified by a segment pair number "5" saved in the first rewriting table of FIG. 8 is higher than the other rewriting probabilities P $(\alpha \to \beta|z=2)$ and P $(\alpha \to \beta|z=3)$. In such a case, the transliteration probability P $(t_2|s_2, z=1)$ that an original spelling string $s_2$ "xxaget" including the original segment "get$" is transliterated into a target spelling string $t_2$ "Δ 7ジェ I" including the transliterated segment "ジェ I" is calculated using the above formula (3). Then, as shown in FIG. 12A, the transliteration probability P $(t_2|s_2, z=1)$ is higher than the other transliteration probabilities P $(t_2|s_2, z=2)$ and P $(t_2|s_2, z=3)$.

As the transliteration probability P $(t_2|s_2, z=1)$ is higher than the other transliteration probabilities P $(t_2|s_2, z=2)$ and P $(t_2|s_2, z=3)$, the weighted transliteration probability $\gamma_{21}$ calculated by the above formula (4) becomes higher than the other transliteration probabilities $\gamma_{22}$ and $\gamma_{23}$ as shown in FIG. 12B.

As the weighted transliteration probability $\gamma_{21}$ becomes higher, the optimum weighting parameter $\pi_1^*$ calculated by the above formula (6) becomes greater than the other weighting parameters $\pi_2^*$ and $\pi_3^*$. Then, the weighted transliteration probability $\gamma_{21}$ calculated by the above formula (4) becomes further higher.

As the weighted transliteration probability $\gamma_{21}$ becomes further higher, the rewriting probability P $(\alpha \to \beta|z=1)$ calculated by the above formula (7) is updated to a value higher than the other rewriting probabilities P $(\alpha \to \beta|z=2)$ and P $(\alpha \to \beta|z=3)$ as shown in FIG. 12C. Then, the transliteration probability P $(t_2|s_2, z=1)$ becomes much higher than the other transliteration probabilities P $(t_2|s_2, z=2)$ and P $(t_2|s_2, z=3)$.

In the above explanation, the first transliteration table corresponds to an implicit language in which the original segment "get$" constituting the end of an original spelling string $s_n$ is rewritten as the transliterated segment "ジェ I" with a high rewriting probability, such as the French language. With such a first transliteration table, as described above, there is a high transliteration probability P $(t_2|s_2, z=1)$ that an original spelling string $s_2$ "xxaget" of which the original language is an implicit language such as French is transliterated to a target spelling string $t_2$ "Δ 7ジェ" according to the phonetics of the original language even though the implicit language is not specified.

With the above configuration, the transliteration probability P $(t_n|s_n, z=k)$ is calculated using the rewriting probability P $(\alpha \to \beta|z=k)$ and then the rewriting probability P $(\alpha \to \beta|z=k)$ is so updated as to maximize the expected value Q of the likelihood function L calculated using the transliteration probability P $(t_n|s_n, z=k)$. Subsequently, the calculation of the transliteration probability P $(t_n|s_n, z=k)$ and update of the rewriting probability P $(\alpha \to \beta|z=k)$ are repeated. Therefore, even if both the implicit language corresponding to the rewriting table saving information presenting the rewriting probability P ($\alpha \rightarrow \beta | z = k$) and the implicit languages corresponding to the transliteration table saving information presenting the transliteration probability P ($t_n | s_n$, $z = k$) are unknown (in other words, the original language of an original spelling string $s_n$ to be transliterated is unknown), it can be determined whether the transliterated target spelling string $t_n$ is transliterated from the string to be transliterated more accurately than the prior art based on the transliteration probability P ($t_n | s_n$, $z = k$).

Furthermore, with the above configuration, the origin probability (namely, the expected value of the random variable $z_{nk}$ and the origin probability) $\gamma_{nk}$ is calculated using the transliteration probability P ($t_n | s_n$, $z = k$) and weighting parameter $\pi_k$. Subsequently, not only the transliteration probability P ($t_n | s_n$, $z = k$) but also the weighting parameter $\pi_k$ are so updated as to maximize the expected value of the likelihood function L calculated using not only the transliteration probability P ($t_n | s_n$, $z = k$) but also the origin probability $\gamma_{nk}$. Therefore, the expected value of the likelihood function L is further maximized compared with the prior art. Consequently, even if the original language of an original spelling string $s_n$ to be transliterated is unknown, it can be determined with accuracy whether the transliterated target spelling string $t_n$ is transliterated from the string to be transliterated.

With the above configuration, the transliteration probability $P_{\alpha\beta}$ ($s_n | t_n$) included in one basic transliteration table is generated from one basic rewriting table by executing the $\alpha\beta$ method. Then, the generated transliteration probability $P_{\alpha\beta}$ ($s_n | t_n$) is altered for each of K languages to generate K transliteration tables corresponding to the K languages. Subsequently, the transliteration probabilities P ($t_n | s_n$, $z = k$) included in the generated K transliteration tables, respectively, are updated by the EM algorithm. Therefore, it is possible to reduce the amount of calculation required for generating K transliteration tables and maximize the expected value of the likelihood function L in a more reliable manner than the prior art.

Furthermore, with the above configuration, the transliteration probability P ($t_n | s_n$, $z = k$) and weighting parameter $\pi_k$ are repeatedly updated until the change of the expected value Q of the likelihood function L becomes less than a given magnitude, whereby it is possible to maximize the expected value Q of the likelihood function L in a more reliable manner than the prior art.

Furthermore, with the above configuration, a first string and a second string are received and the probability that the received second string is transliterated from the first string is output. Therefore, as long as a first string and a second string are received, the probability that the second string is transliterated from the first string can be calculated more accurately than the prior art and output even if the original language of the first string is unknown. Then, simply entering a first string and a second string that is a possible transliteration of the first string, the user using the transliteration device 100 can know the transliteration probability between the first and second strings even if he/she does not know what the original language of the first string is. Therefore, the user can determine whether the second string is the correct transliteration of the first string easily and accurately based on the transliteration probability.

Furthermore, with the above configuration, a first string that is not included in the training set is received and the transliteration probability between the received first string and a second string is calculated. Therefore, the probability that a second string is transliterated from a first string can be calculated more accurately than the prior art even for a pair consisting of a string not included in the training set in advance and a second string (namely, an input pair).

Here, in this embodiment, the number of languages, K, presented by information sent from the terminal device 200 is received in the Step S34 of FIG. 7. However, the value of K can be set in the transliteration device 100 in advance. Furthermore, the number of languages, K, can be set to multiple values instead of a single value. For example, if the K is set to three values "3," "4," and "5," the user can determine whether a second string is correct transliteration of a first string based on the highest transliteration probability among the transliteration probabilities obtained for the these values.

Modified Embodiment 1

Modified Embodiment 1 of this embodiment will be described hereafter.

In this embodiment, the generation part 105 of FIG. 5 generates the basic transliteration table of FIG. 6A saving information presenting the transliteration probability $P_{\alpha\beta}$ ($s_n | t_n$) in the Step S53 of FIG. 10, and then generates the first to third transliteration tables based on the basic transliteration table in the Step S64 of FIG. 11. Furthermore, in this embodiment, the update part 107 of FIG. 5 does not execute the Step 1E upon the first execution of the Step S37 (namely, the Step E) of FIG. 7. Here, the Step 1E is a step of calculating the transliteration probability P ($t_n | s_n$, $z = k$) by the $\alpha\beta$ method using the first to third rewriting tables.

However, the above is not restrictive. In Modified Embodiment 1, the generation part 105 of FIG. 5 generates a basic transliteration table that does not save information presenting the transliteration probability $P_{\alpha\beta}$ ($s_n | t_n$) in the Step S53 of FIG. 10. Then, the generation part 105 of FIG. 5 generates the first to third transliteration tables based on the basic transliteration table in the Step S62 of FIG. 11. Subsequently, the update part 107 of FIG. 5 executes the Steps 1E to 3E in sequence upon the first execution of the Step S37 of FIG. 7. In this Modified Embodiment 1, the generation part 105 can set the rewriting probabilities P ($\alpha \rightarrow \beta | z = 1$) to P ($\alpha \rightarrow \beta | z = 3$) associated with information presenting the same segment pair number j to the rewriting probability P ($\alpha \rightarrow \beta$) associated with information presenting the segment pair number j plus, minus, multiplied by, or divided by a random value, or to values different from each other by a given quantity for K languages.

With the above configuration, even though K rewriting tables corresponding to K languages are generated by altering the rewriting probability P ($\alpha \rightarrow \beta$) included in one basic rewriting table, the calculation of the transliteration probability P ($t_n | s_n$, $z = k$) and update of the rewriting probability P ($\alpha \rightarrow \beta | z = k$) are repeated. This makes it possible to reduce the amount of calculation required for generating K rewriting tables and maximize the expected value Q of the likelihood function L in a more reliable manner than the prior art.

Modified Embodiment 2

Modified Embodiment 2 of this embodiment will be described hereafter.

Figure 13A:
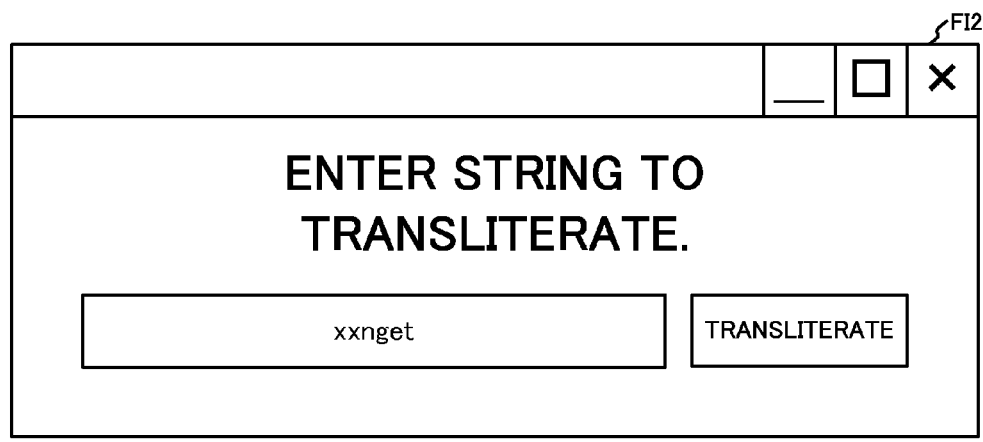
FIG. 13A is an illustration presenting an exemplary input screen displayed by the terminal device according to Modified Embodiment 2 of the embodiment of the present invention.

In Modified Embodiment 3, the terminal device 200 of FIG. 1 displays an input screen FI2 as shown in FIG. 13A instead of the input screen FI1 of FIG. 2A to enable input of a first string spelled in any original language. Then, the terminal device 200 enters various signals corresponding to the operation of the user into the transliteration system 1, generates a first string based on the entered signals, and sends information presenting the generated first string to the transliteration device 100. Subsequently, the terminal device 200 receives information returned from the transliteration device 100. Then, the terminal device 200 displays a results display screen FO2 as shown in FIG. 13B instead of the results display screen FO1 of FIG. 2B. Subsequently, the terminal device 200 displays, based on the received information, the first string and a list of candidate strings into which the first string can be transliterated in the aforementioned given target languages along with the probability that the first string is transliterated into the candidate string on the results display screen FO2 in the ascending order of the probability. Here, the terminal device 200 can display the candidate strings in the descending order of the probability. Furthermore, the terminal device 200 can display the highest probability first string, only one candidate string, and its probability. Furthermore, the terminal device 200 can display the highest probability, first string, only one candidate string, and its probability only if the highest probability exceeds a given threshold.

Figure 14:
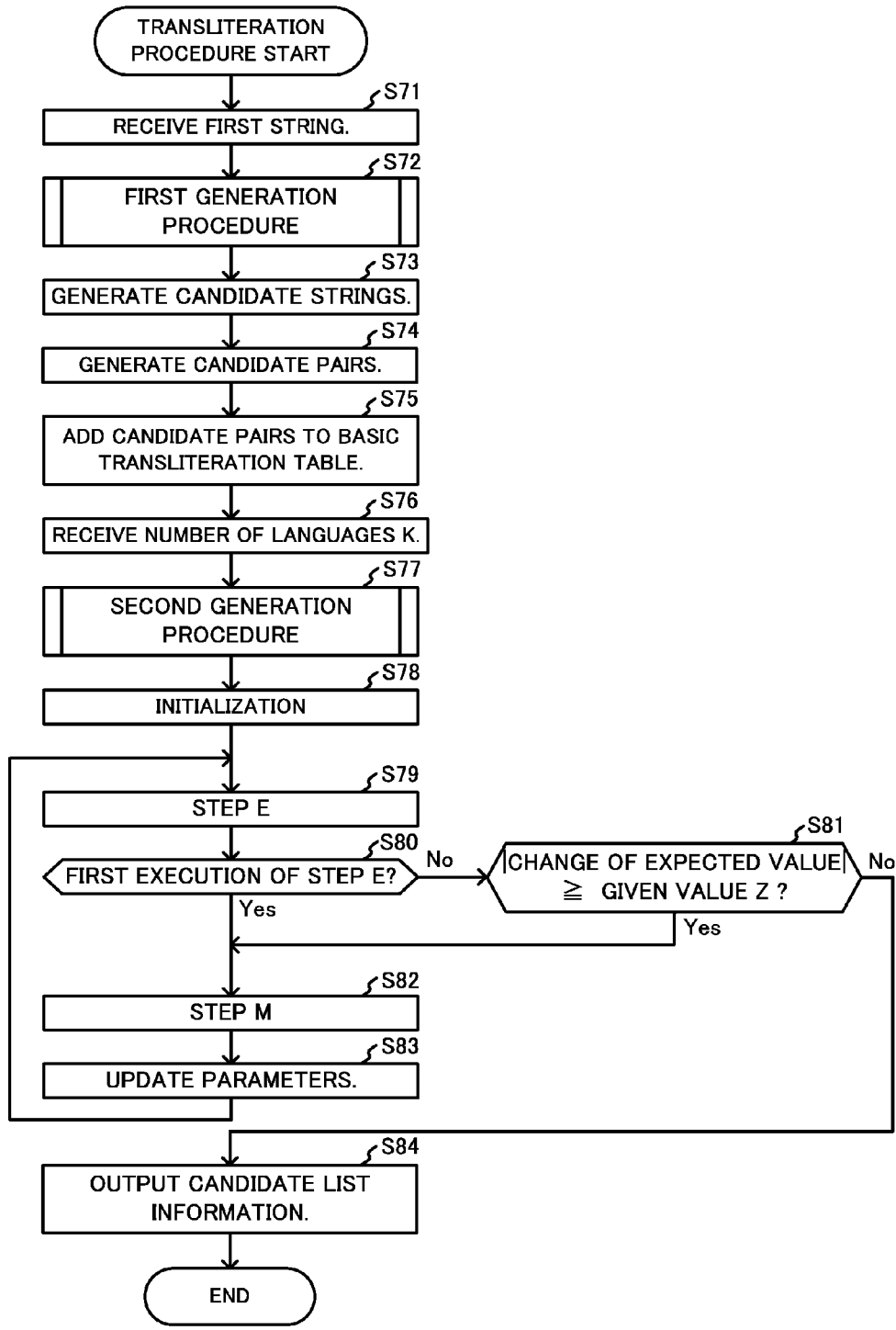
FIG. 14 is a flowchart presenting another exemplary transliteration procedure executed by the transliteration device according to Modified Embodiment 2 of the embodiment of the present invention.
Figure 15:
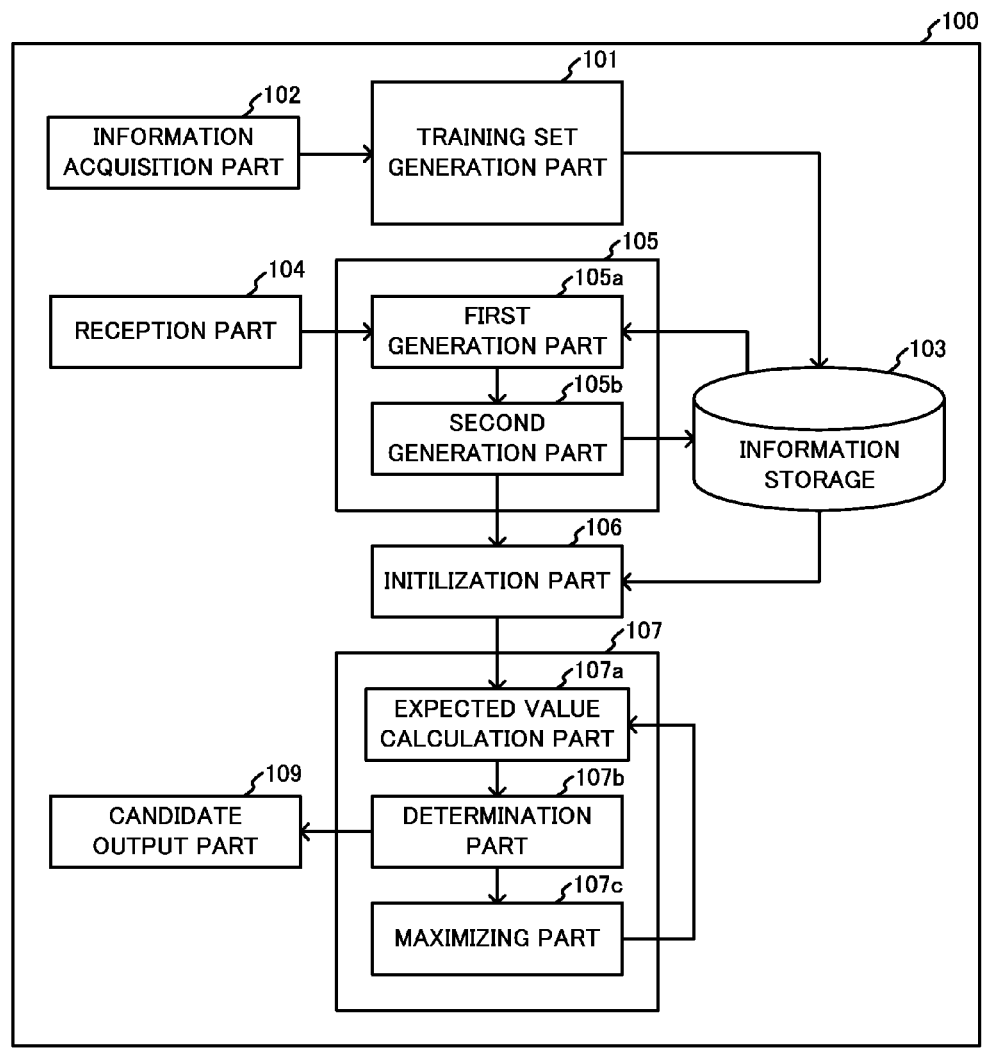
FIG. 15 is a block diagram presenting exemplary functions exerted by the transliteration device according to Modified Embodiment 2 of the embodiment of the present invention.

The CPU 100a of the transliteration device 100 of Modified Embodiment 2 executes a transliteration procedure of FIG. 14, not of FIG. 7, using the hardware of FIG. 3 so as to function as the functional parts 101 to 107 as shown in FIG. 15, not in FIG. 5, and a candidate output part 109.

As the transliteration procedure of FIG. 14 starts, the reception part 104 of FIG. 15 receives a first string presented by information sent from the terminal device 200 (Step S71). Then, the generation part 105 executes the first generation procedure of FIG. 10 (Step S72). Subsequently, the generation part 105 generates multiple candidate strings for the received first string (Step S73).

More specifically, the generation part 105 divides the first string in any way of dividing S and acquires all possible segment strings or segment characters (segments, hereafter). Then, the generation part 105 generates all combinations (namely, all permutations) of the same segments as the acquired segments among the original segments α forming the segment pairs presented by information saved in the basic rewriting table of FIG. 8A. Then, the generation part 105 identifies those equal to the first string among the all combinations generated. Subsequently, the generation part 105 acquires from the basic rewriting table of FIG. 8A all pieces of information presenting the segment pairs of which the original segments α constitute the identified combinations. Then, the generation part 105 combines the transliterated segments β forming the segment pairs presented by the acquired information according to the combination (namely, permutation) of the original segments α paired with the transliterated segments β. In this way, the generation part 105 generates all possible candidate strings as the transliteration of the first string.

After the Step S73 of FIG. 14, the generation part 105 generates a pair consisting of the first string received in the Step S71 and a candidate string that is a possible transliteration of the first string (the candidate pair, hereafter) for each of the multiple candidate strings generated (Step S74). Subsequently, the generation part 105 adds the candidate pair to the training set as a transliteration pair, and increases the number of transliteration pairs in the training set, N, by the number of added candidate pairs. Then, the generation part 105 associates and additionally saves in the basic transliteration table of FIG. 6A information presenting the candidate pair and information presenting a number n for identifying the candidate pair (Step S75).

Subsequently, the processing of the Steps S67 to S83 of FIG. 14, which is the same as that of the Steps S34 to S41 of FIG. 7, is executed.

During the execution of the above processing, if the determination part 107b determines that the absolute value of the change from the expected value Q of the likelihood function L calculated last time to the expected value Q of the likelihood function L calculated this time is lower than a given value Z in the Step S81 (Step S81; No), the processing of Step S84 is executed and then the execution of the transliteration procedure ends. In the Step S84, the candidate output part 109 of FIG. 15 makes reference to information presenting the transliteration probabilities ($t_N|s_N$, $z=1$) to ($t_N|s_N$, $z=3$) associated with information presenting the numbers n identifying the candidate pairs in the first transliteration table of FIG. 6B to the third transliteration table of FIG. 6D. Subsequently, the candidate output part 109 generates candidate list information associating information presenting the candidate pairs and information presenting the highest transliteration probability among the referred transliteration probabilities ($t_N|s_N$, $z=1$) to ($t_N|s_N$, $z=3$). Subsequently, the candidate output part 109 sorts the candidate string list presented by the generated candidate list information (the candidates list, hereafter) in the ascending or descending order based on the highest transliteration probability. Subsequently, the candidate output part 109 outputs (namely, transmits) the sorted list to the terminal device 200 sequentially from the top of the list, and ends the processing of the Step S84.

With the above configuration, a first string is received and multiple candidate strings that are possible transliteration of the first string are output based on the transliteration probability that the candidate string is a transliteration of the first string. Then, as long as a first string is received, multiple candidate strings can be output in the ascending or descending order of the transliteration probability even if the original language of the first string is unknown. Consequently, simply entering a first string into the transliteration device 100, the user using the transliteration device 100 can acquire multiple candidate strings that are possible transliteration of the first string even if he/she does not know what the original language of the first string is.

Furthermore, with the above configuration, a first string that is not included in the training set is received, candidate strings for the received first string are generated, and the transliteration probabilities with the generated candidate strings are calculated. Therefore, as long as a first character is received, multiple candidate strings can be output in the ascending or descending order even if the first string is not included in the training set in advance.

Modified Embodiment 3

Modified Embodiment 3 of this embodiment will be described hereafter.

Figure 16:
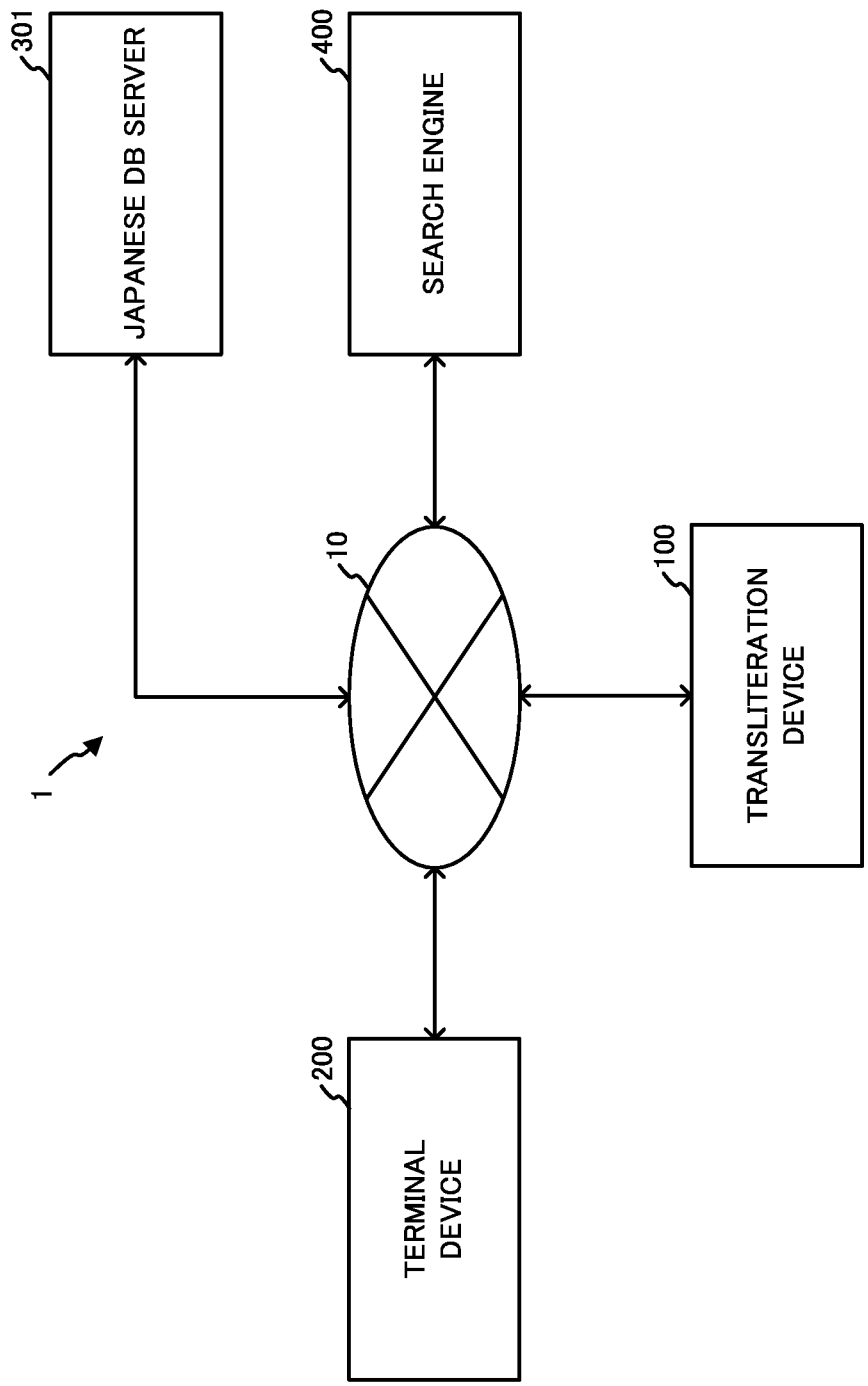
FIG. 16 is an illustration presenting an exemplary system configuration of the transliteration system according to Modified Embodiment 3 of the embodiment of the present invention.

The transliteration system 1 of Modified Embodiment 3 has a search engine 400 as shown in FIG. 16 instead of the foreign language DB server 302 of FIG. 1.

Figure 17:
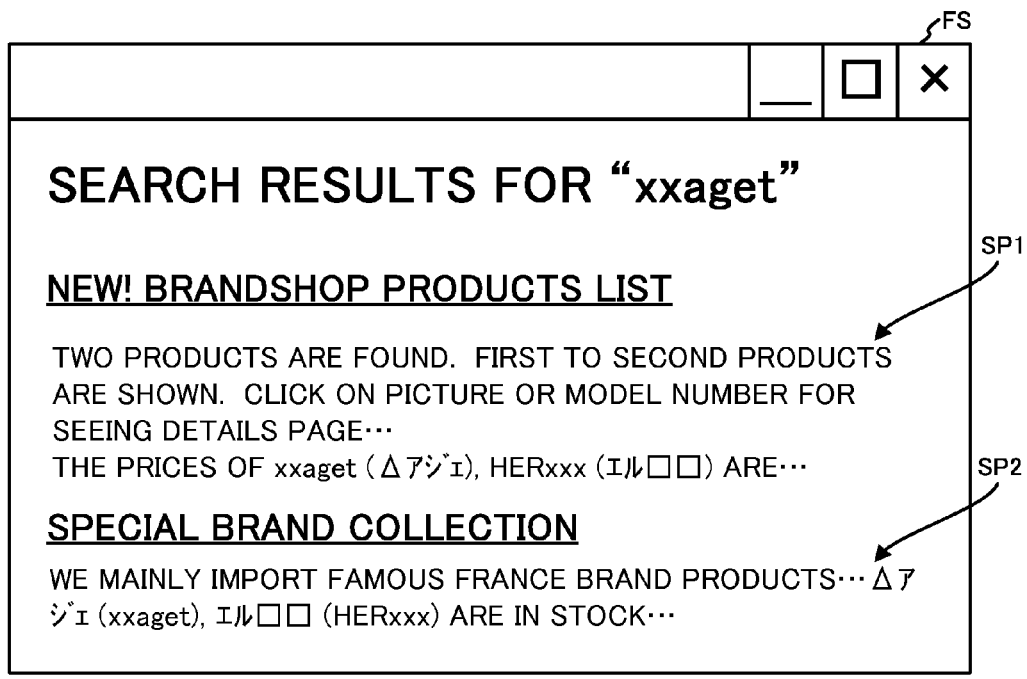
FIG. 17 is an illustration presenting an exemplary search results screen returned by a search engine.

The search engine 400 associates and stores information presenting a search keyword, information presenting the URL of a web (worldwide web) page including the search keyword in its contents, and information presenting a snippet that is the part of the contents of the web page that includes the keyword. Receiving information presenting a search keyword and a search request from the transliteration device 100, the search engine 400 searches for multiple pieces of information presenting snippets to store in association with the received information presenting a search keyword. Subsequently, the search engine 400 returns information presenting a search results screen FS including snippets SP1 and SP2 as shown in FIG. 17 to the transliteration device 100.

Figure 18:
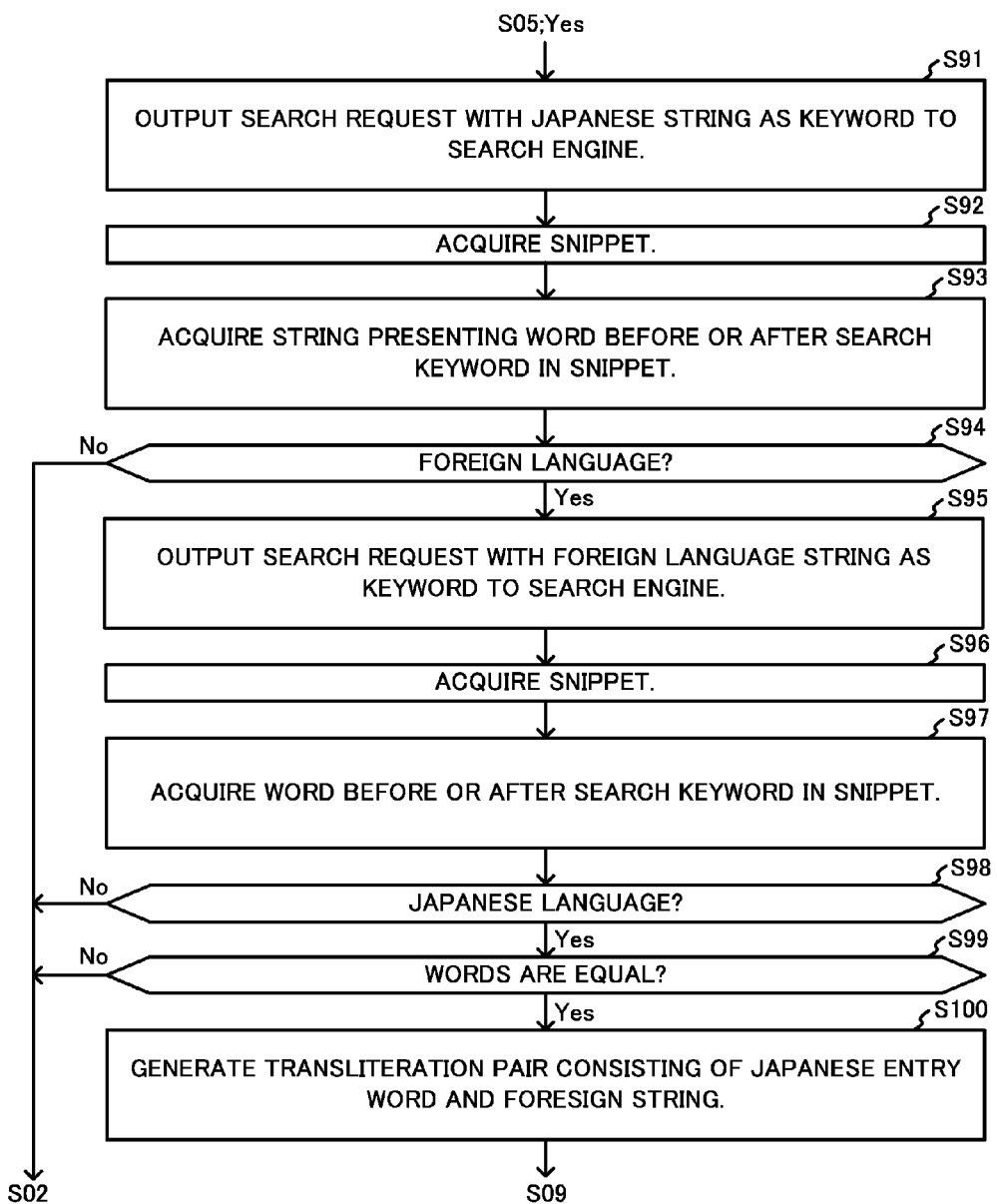
FIG. 18 is a flowchart presenting another exemplary transliteration procedure executed by the transliteration device according to Modified Embodiment 3 of the embodiment of the present invention.

If the string acquired from an entry word of a Japanese online encyclopedia is determined to be a proper name in execution of the training set generation procedure of FIG. 4 (Step S05; Yes), the transliteration device 100 of Modified Embodiment 3 executes Step S91 of FIG. 18 instead of the Step S06. In the Step S91, the transliteration device 100 outputs the Japanese string as a search keyword and a search request to the search engine 400 of FIG. 16. Then, the information acquisition part 102 of the transliteration device 100 shown in FIG. 5 acquires multiple pieces of information presenting snippets found based on the search keyword from the search engine 400 (Step S92).

Subsequently, the training set generation part 101 of the transliteration device 100 shown in FIG. 5 acquires a word situated within a given number of words before or after the search keyword (namely, the string posted as a Japanese entry word) in the snippet (Step S93). Subsequently, the training set generation part 101 determines whether the acquired word is presented by a string spelled in a foreign language based on whether the word is presented by a string consisting of alphabets (Step S94). If the acquired word is not presented by a string spelled in a foreign language (Step S94; No), the processing is repeated from the Step S02 of FIG. 4.

On the other hand, if the acquired word is presented by a string spelled in a foreign language (Step S94; Yes), the training set generation part 101 executes the same processing as that of the Steps S91 and S92 using the acquired foreign language string as the search keyword (Steps S95 and S96).

Subsequently, the training set generation part 101 determines whether the acquired word is presented by a string spelled in Japanese (Step S98). More specifically, the training set generation part 101 determines that the acquired word is presented by a string spelled in Japanese if the word is presented by a string consisting of any one or more of Kanji, Hiragana, and/or Katakana. On the other hand, the training set generation part 101 determines that the acquired word is not presented by a string spelled in Japanese if the word is presented by a string consisting of none of Kanji, Hiragana, and/or Katakana.

If the acquired word is not presented by a string spelled in Japanese in the Step S98 (Step S98; No), the processing is repeated from the Step S02 of FIG. 4. On the other hand, if the acquired word is presented by a string spelled in Japanese (Step S98; Yes), the training set generation part 101 determines whether the string acquired from the Japanese entry word in the Step S03 of FIG. 4 is equal to the Japanese string acquired from the snippet in the Step S97 of FIG. 18 (Step S99). If the two strings are not equal (Step S99; No), the processing is repeated from the Step S02 of FIG. 4.

If the two strings are equal in the Step S99 (Step S99; Yes), the training set generation part 101 generates a transliteration pair consisting of the Japanese string acquired from the Japanese entry word and the foreign language string acquired from the snippet found based on the Japanese string (Step S100). Then, the training set generation part 101 designates the foreign language string as an original spelling string $s_n$ and the Japanese string as a target spelling string $t_n$ (namely, the transliteration of the original spelling string $s_n$). Subsequently, the processing of the Step S09 of FIG. 4 to add the transliteration pair to the training set follows and the execution of the training set generation procedure of FIG. 4 continues.

In this Modified Embodiment 4, the transliteration device 100 acquires a foreign language string from a snippet found based on a Japanese string acquired from an entry word of a Japanese online encyclopedia. Then, the transliteration device 100 acquires a Japanese string from a snippet found based on the acquired foreign language string. Subsequently, if these two Japanese strings are equal, the transliteration device 100 designates the foreign language string as an original spelling string $s_n$ and the Japanese string as a target spelling string $t_n$. However, this is not restrictive and the following modification can be made. In this modified embodiment, the transliteration device 100 acquires a Japanese string from a snippet found based on a foreign language string acquired from an entry word of an online foreign language encyclopedia. Then, the transliteration device 100 acquires a foreign language string from a snippet found based on the acquired Japanese string. Subsequently, if these two strings are equal, the transliteration device 100 designates the foreign language string as an original spelling string $s_n$ and the Japanese string as a target spelling string $t_n$.

Generally, when an original spelling string $s_n$ and a target spelling string $t_n$ have a transliteration relationship, they are often situated close to each other on a web page. Therefore, with this configuration, a transliteration pair consisting of an original spelling string $s_n$ and a target spelling string $t_n$ can be acquired more accurately and easily than the prior art even if the original language of the original spelling string $s_n$ is unknown. Furthermore, a transliteration pair consisting of an original spelling string $s_n$ and a target spelling string $t_n$ can be acquired more accurately and easily than the prior art even if the original language of an original spelling string $s_n$ is known but the phonetics of the original spelling string $s_n$ in the original language is unknown.

In this embodiment, as shown in FIGS. 6A to 6D and FIG. 9, the target spelling string $t_n$ is written in Katakana. This is not restrictive. The target spelling string $t_n$ can be written in other characters such as Roman letters and phonetic symbols. Similarly, as shown in FIGS. 8A to 8D and FIG. 9, the transliterated segment β is written in Katakana. This is not restrictive. The transliterated segment β can be written in other characters such as Roman letters and phonetic symbols.

This embodiment and Modified Embodiments 1 to 3 can be combined with each other. Not only the transliteration device 100 comprising the configuration for realizing the functions according to this embodiment but also the transliteration system composed of multiple devices and collectively comprising the configuration for realizing the functions according to this embodiment can be provided.

Needless to say, the transliteration device 100 comprising the configuration for realizing the functions according to this embodiment in advance can be provided. In addition, application of programs allows an existing transliteration device 100 to function as the transliteration device 100 according to this embodiment. In other words, the transliteration programs for realizing the functional configuration of the transliteration device 100 exemplified in the above embodiment can be applied so that the computer (a CPU and the like) controlling an existing transliteration device can execute them to function as the transliteration device 100 according to this embodiment.

Such programs can be distributed by any method and, for example, stored and distributed on a recording medium such as a memory card, CD-ROM, and DVD-ROM, or distributed via a communication medium such as the Internet. Furthermore, the transliteration method according to the present invention can be implemented using the transliteration device 100 according to the present invention.

Furthermore, the transliteration method according to the present invention can be implemented using the transliteration device 100.

Preferred embodiments of the present invention are described above. The present invention is not confined to such particular embodiments. Various modifications and changes can be made within the scope of the gist of the present invention set forth in the scope of claims. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

This application is based on Japanese Patent Application No. 2011-48384, filed on Mar. 4, 2011, and the entire specification, scope of claims, and drawings of which are incorporated herein by reference.

INDUSTRIAL APPLICABILITY

The present invention is suitable for server devices providing service of determining whether a string received from a terminal device is transliteration from a string to be transliterated in response to a request from the terminal device.

DESCRIPTION OF REFERENCE NUMERALS

10: Communication network
100: Transliteration device
100a: CPU
100b: ROM
100c: RAM
100d: Hard disc
100e: Media controller
100f: LAN card
100g: Video card
100h: LCD
100i: Keyboard
100j: Speaker
100k: Mouse
101: Training set generation part
102: Information acquisition part
103: Information storage
104: Reception part
105: Generation part
105a: First generation part
105b: Second generation part
106: Initialization part
107: Update part
107a: Expected value calculation part
107b: Determination part
107c: Maximizing part
108: Probability output part
109: Candidate output part
200: Terminal device
301: Japanese DB server
302: Foreign language DB server
400: Search engine

The invention claimed is:

1. A transliteration device, comprising:
a generator generating, from a training set including multiple transliteration pairs consisting of an original spelling string spelled in any original language and a target spelling string transliterated from the original spelling string and spelled in a given target language and at least including original spelling strings of J original languages, K rewriting tables corresponding to K different implicit languages and including multiple sets of an original segment constituting said original spelling string, wherein J is a natural number and is greater than or equal to 2, and K is a natural number less than or equal to J, a transliterated segment constituting said target spelling string, and a rewriting probability that the original segment is rewritten as the transliterated segment for transliteration, and K transliteration tables corresponding to said K implicit languages and including multiple transliteration pairs included in said training set; and
an updater calculating, for each of multiple transliteration pairs included in said training set, a transliteration probability that the original spelling string of the transliteration pair is transliterated to the target spelling string of the transliteration pair when the original spelling string originates from the implicit language corresponding to the rewriting table using the rewriting probabilities included in said K rewriting tables, saving the transliteration probability in the transliteration table corresponding to the implicit language in association with the transliteration pair, so updating the rewriting probabilities included in said K rewriting tables as to maximize an expected value, which is calculated using the transliteration probability, of a likelihood function calculating a likelihood presenting how likely said K transliteration tables are when said training set is obtained, and repeating said calculation of the transliteration probabilities and said update of the rewriting probabilities.

2. The transliteration device according to claim 1, further comprising:
an initiator initializing weighting parameters for said K transliteration tables each indicating a ratio of the number of the original spelling strings originating from the implicit language corresponding to each of said K transliteration tables to the number of multiple original spelling strings included in said training set,
wherein said updater calculates, for each of the multiple transliteration pairs included in said training set, an origin probability said original spelling string originates in the implicit language corresponding to the transliteration table based on the weighted average by said weighting parameters of the transliteration probabilities included in said K transliteration tables, so updates said K weighting parameters as to maximize said expected value of the likelihood function that is calculated further using the origin probability, and repeats said calculation of the origin probability and said update of the weighting parameters.

3. The transliteration device according to claim 2, wherein:
said generator generates said K rewriting tables corresponding to K languages by generating one of said rewriting tables and altering the rewriting probability included in said one generated rewriting table for each of said K languages.

4. The transliteration device according to claim 2, wherein:
said generator generates said K transliteration tables corresponding to K languages by generating one of said transliteration tables by an $\alpha\beta$ method using one of said rewriting tables and altering the transliteration probability included in said one generated transliteration table; and
said updater updates the transliteration probabilities included in said K transliteration tables, respectively, using an EM algorithm.

5. The transliteration device according to claim 3 or 4, wherein:
said updater repeats said update until a change of said expected value of the likelihood function due to said update becomes smaller than a given magnitude.

6. The transliteration device according to claim 5, further comprising:
- a receiver receiving a first string spelled in said any original language and a second string spelled in said given target language; and
- a probability outputter obtaining the transliteration probability that said received first string is transliterated into said received second string using said K transliteration tables and outputting the obtained transliteration probability.

7. The transliteration device according to claim 5, further comprising:
- a receiver receiving a first string spelled in said any original language; and
- a candidate outputter obtaining candidate strings in said given target languages into which said received first string can be transliterated and the transliteration probabilities that said received first string is transliterated into the candidate strings using said K transliteration tables, and outputting the obtained candidate strings in the ascending order of the obtained transliteration probability.

8. The transliteration device according to claim 6, wherein: said receiver receives a first string that is not included in said training set.

9. The transliteration device according to claim 7, wherein: said receiver receives a first string that is not included in said training set.

10. A non-transitory computer-readable recording medium on which a transliteration program is recorded, the transliteration program allowing a computer to function as:
- a generator generating, from a training set including multiple transliteration pairs consisting of an original spelling string spelled in any original language and a target spelling string transliterated from the original spelling string and spelled in a given target language and at least including original spelling strings of J original languages, K rewriting tables corresponding to K different implicit languages and including multiple sets of an original segment constituting said original spelling string, wherein J is a natural number and is greater than or equal to 2, and K is a natural number less than or equal to J, a transliterated segment constituting said target spelling string, and a rewriting probability that the original segment is rewritten as the transliterated segment for transliteration, and K transliteration tables corresponding to said K implicit languages and including multiple transliteration pairs included in said training set; and
- an updater calculating, for each of multiple transliteration pairs included in said training set, a transliteration probability that the original spelling string of the transliteration pair is transliterated to the target spelling string of the transliteration pair when the original spelling string originates from the implicit language corresponding to the rewriting table using the rewriting probabilities included in said K rewriting tables, saving the transliteration probability in the transliteration table corresponding to the implicit language in association with the transliteration pair, so updating the rewriting probabilities included in said K rewriting tables as to maximize an expected value, which is calculated using the transliteration probability, of a likelihood function calculating a likelihood presenting how likely said K transliteration tables are when said training set is obtained, and repeating said calculation of the transliteration probabilities and said update of the rewriting probabilities.

11. A transliteration method executed by a transliteration device provided with a generator and an updater, comprising:
- a generation step in which said generator generates, from a training set including multiple transliteration pairs consisting of an original spelling string spelled in any original language and a target spelling string transliterated from the original spelling string and spelled in a given target language and at least including original spelling strings of J original languages, K rewriting tables corresponding to K different implicit languages and including multiple sets of an original segment constituting said original spelling string, wherein J is a natural number and is greater than or equal to 2, and K is a natural number less than or equal to J, a transliterated segment constituting said target spelling string, and a rewriting probability that the original segment is rewritten as the transliterated segment for transliteration, and K transliteration tables corresponding to said K implicit languages and including multiple transliteration pairs included in said training set; and
- an update step in which said updater calculates, for each of multiple transliteration pairs included in said training set, a transliteration probability that the original spelling string of the transliteration pair is transliterated to the target spelling string of the transliteration pair when the original spelling string originates from the implicit language corresponding to the rewriting table using the rewriting probabilities included in said K rewriting tables, saves the transliteration probability in the transliteration table corresponding to the implicit language in association with the transliteration pair, so updates the rewriting probabilities included in said K rewriting tables as to maximize an expected value, which is calculated using the transliteration probability, of a likelihood function calculating a likelihood presenting how likely said K transliteration tables are when said training set is obtained, and repeats said calculation of the transliteration probabilities and said update of the rewriting probabilities.

12. The transliteration device according to claim 4, wherein:
said updater repeats said update until the change of said expected value of a likelihood function due to said update becomes smaller than a given magnitude.

* * * * *